US010860214B2

(12) United States Patent
Farey

(10) Patent No.: US 10,860,214 B2
(45) Date of Patent: Dec. 8, 2020

(54) SYSTEMS AND METHODS FOR MEMORY LOAD BALANCING

(71) Applicant: Stormagic Limited, Bristol (GB)

(72) Inventor: Christopher J. Farey, Bristol (GB)

(73) Assignee: STORMAGIC LIMITED, Bristol (GB)

( * ) Notice: Subject to any disclaimer, the term of this patent is extended or adjusted under 35 U.S.C. 154(b) by 8 days.

(21) Appl. No.: 15/816,888

(22) Filed: Nov. 17, 2017

(65) Prior Publication Data
US 2019/0155515 A1 May 23, 2019

(51) Int. Cl.
*G06F 12/02* (2006.01)
*G06F 3/06* (2006.01)
*G06F 12/0866* (2016.01)

(52) U.S. Cl.
CPC .......... *G06F 3/0611* (2013.01); *G06F 3/0659* (2013.01); *G06F 3/0683* (2013.01); *G06F 3/0688* (2013.01); *G06F 12/02* (2013.01); *G06F 12/0238* (2013.01); *G06F 12/0866* (2013.01)

(58) Field of Classification Search
CPC .... G06F 3/0611; G06F 3/0659; G06F 3/0683; G06F 3/0688; G06F 12/02; G06F 12/08
USPC ......................................................... 711/154
See application file for complete search history.

(56) References Cited

U.S. PATENT DOCUMENTS

| | | | |
|---|---|---|---|
| 9,141,176 B1 | 9/2015 | Chen | |
| 2004/0230742 A1* | 11/2004 | Ikeuchi | G06F 3/0689 711/112 |
| 2007/0083703 A1 | 4/2007 | Kolli et al. | |
| 2011/0161980 A1 | 6/2011 | English et al. | |
| 2012/0278530 A1* | 11/2012 | Ebsen | G06F 3/0659 711/103 |
| 2015/0201018 A1* | 7/2015 | Abram | H04L 67/1097 707/736 |
| 2015/0378622 A1* | 12/2015 | DeNeui | G06F 3/0619 711/114 |
| 2016/0026386 A1* | 1/2016 | Ellis | G06F 3/061 711/103 |
| 2016/0239205 A1* | 8/2016 | Rothberg | G06F 3/064 |

(Continued)

OTHER PUBLICATIONS

Stormagic Limited, International Search Report and Written Opinion, PCT/IB2018/001243, dated Feb. 27, 2019, 11 pgs.

*Primary Examiner* — Gautam Sain
(74) *Attorney, Agent, or Firm* — Morgan, Lewis & Bockius LLP

(57) ABSTRACT

The various embodiments described herein include methods, devices, and systems for processing memory operation requests. In one aspect, a method is performed at a computing system having one or more processors and non-volatile memory: (1) obtaining a plurality of internal memory operation requests for the non-volatile memory, the plurality of internal memory operation requests originating from within the computing system; (2) obtaining a plurality of external memory operation requests for the non-volatile memory, the plurality of external memory operation requests originating from one or more devices remote and distinct from the computing system; and (3) regulating a rate at which the plurality of internal memory operation requests are transferred to the non-volatile memory based on an amount of external memory operation requests in the plurality of external memory requests.

20 Claims, 20 Drawing Sheets

(56) References Cited

U.S. PATENT DOCUMENTS

2017/0010815 A1\* 1/2017 Sprouse ................ G06F 3/0604
2018/0067694 A1\* 3/2018 Berman ................ G06F 3/0659

\* cited by examiner

SYSTEMS AND METHODS FOR MEMORY LOAD BALANCING

TECHNICAL FIELD

This relates generally to processing memory operation requests, including but not limited to, balancing internal and external memory operations.

BACKGROUND

Storage systems, whether external or server-based, use a variety of storage services to provide features such as data protection and performance optimization. Thus, there is typically a mixture of externally-generated (e.g., from a client and/or application) memory operations (I/O) along with internally-generated I/O (e.g., cache loads and flushes and meta-data reads and writes). In conventional systems the internally-generated I/O may use much of the I/O bandwidth in both Hard Disk Drives (HDDs) and Solid State Drives (SSDs). This results in a significant drop in performance (e.g., higher latency) for the externally-generated I/O, leading to a poor user experience.

Accordingly, there is a need for systems and/or devices with more efficient, accurate, and effective methods for memory load balancing. Such systems, devices, and methods optionally complement or replace conventional systems, devices, and methods for memory load balancing.

SUMMARY

In some implementations it is important that the load generated by internally-generated I/O (internal memory operation requests) is balanced against the amount of externally-generated I/O (external memory operation requests), to prevent degradation in performance. At times of high externally-generated I/O loads, internally-generated I/O need to be throttled back; and at times of low externally-generated loads, high levels of internally-generated I/O should be allowed. The present disclosure describes methods and systems for load balancing between internally- and externally-generated I/O for both HDDs and SSDs.

Some storage systems are based on Hard Disk Drives (HDDs), which are electro-mechanical devices with spinning platters and moving heads. Data is read or written by positioning the head over the part of the platter containing the data and then reading or writing the data. HDDs provide good performance when streaming data such that there is minimal, smooth head movement, but performance can drop by as much as two orders of magnitude when data is read randomly from the platters. When an HDD is shared by a number of applications, such as with a virtualized server environment, the workload could be predominantly random thereby degrading performance. The performance of a storage system can be measured in terms of throughput, e.g., the amount of data which can be read or written per second, or Ms per second (TOPS). TOPS is a measure of the number of random I/Os a storage subsystem can deliver per second.

Some storage systems are based on Sold State Drives (SSDs) and flash memory devices. These storage components may have no moving parts, and, thus, can deliver high performance under both random and sequential workloads. However, SSDs are typically significantly more expensive per Megabyte of storage capacity than HDDs, leading to the emergence of hybrid systems which use a mix of SSDs for performance and HDDs for capacity.

One use of SSDs in hybrid systems is as a cache. A write back SSD cache can be used to stage all changes on the SSD. In this schema, data is later written back to the HDD in a more optimal way, so as to minimize head movement and maximize the HDD performance. A read cache may identify frequently read data and move it from HDD to SDD, to improve performance and reduce the load on the HDDs. Storage software may also maintain its own meta-data, which will need to be stored on HDD or SSD, and need to be read from and written to HDDs or SSDs.

As a result, a mixture of externally-generated I/O and internally-generated I/O are sent to the cache. There is a risk that the internally generated I/O could consume the HDD or SSD I/O bandwidth, resulting in a significant drop in performance seen by externally generated I/O. In some implementations it is important that the load generated by internally generated I/O is balanced against the amount of externally generated I/O, to prevent a significant and unacceptable degradation in performance. As discussed herein, the actual mechanisms used may vary depending on whether the internally generated I/O is to an HDD or an SSD.

(A1) Some implementations include a method for reducing latency of external memory requests to non-volatile memory. The method is performed at a computing system having one or more processors and non-volatile memory. The method includes: (1) obtaining a plurality of internal memory operation requests for the non-volatile memory, the plurality of internal memory operation requests originating from within the computing system; (2) obtaining a plurality of external memory operation requests for the non-volatile memory, the plurality of external memory operation requests originating from one or more devices remote (e.g., distinct) from the computing system; and (3) regulating a rate at which the plurality of internal memory operation requests are transferred to the non-volatile memory based on an amount of external memory operation requests in the plurality of external memory requests.

(A2) In some implementations of the method of A1, the plurality of internal memory operation requests include memory operation requests corresponding to one or more of: a garbage collection process; a caching process; a snapshotting process; and a mirroring process.

(A3) In some implementations of the method of A2, the non-volatile memory comprises one or more hard disk drives (HDDs); and regulating the rate at which the plurality of internal memory operation requests are transferred to the non-volatile memory includes: (1) transferring a first batch of memory operation requests to the one or more HDDs, the first batch including the plurality of internal memory operation requests; (2) assigning to the first batch external memory operation requests obtained while the one or more HDDs process the plurality of internal memory operation requests; and (3) assigning to a subsequent batch external memory operation requests obtained after the one or more HDDs have processed the plurality of internal memory operation requests. For example, each batch includes 32 to 64 internal memory operation requests.

(A4) In some implementations of the method of A3, the one or more HDDs are configured to minimize head movement.

(A5) In some implementations of the methods of A3-A4, the one or more HDDs comprise a plurality of HDDs coupled in a redundant array of independent disks (RAID) configuration.

(A6) In some implementations of the methods of A3-A5, the method further includes: obtaining a second plurality of internal memory operation requests; and, in accordance with a determination that the one or more HDDs have completed the first batch, transferring to the one or more HDDs (1) the second plurality of internal memory operation requests and (2) the external memory operation requests obtained after the one or more HDDs have processed the plurality of internal memory operation.

(A7) In some implementations of the method of A6, the method further includes: (1) maintaining a count of unprocessed operation requests in the first batch of operation requests; and (2) determining that the operations for the first batch of operation requests have completed in accordance with the count of unprocessed operation requests reaching zero.

(A8) In some implementations of the method of A7, maintaining the count of unprocessed operation requests includes: (1) assigning the count a value equal to an initial number of operation requests in the first batch; (2) incrementing the count in response to an addition of an external memory operation request to the first batch; and (3) decrementing the count in response to notification from the one or more HDDs that an operation has completed.

(A9) In some implementations of the methods of A1-A2: (1) the non-volatile memory comprises one or more solid state drives (SSDs); (2) the plurality of external memory operation requests are obtained during a first time period; and (3) regulating the rate at which the plurality of internal memory operation requests are transferred to the memory includes: (a) prior to obtaining the plurality of external memory operation requests, determining an anticipated number of external requests to be obtained in the first time period; (c) based on the anticipated number of external requests, transferring a percentage of the plurality of internal memory requests to the memory during the first time period; (d) transferring the plurality of external memory operation requests to the one or more SSDs during the first time period; (e) determining whether an amount of memory operation requests processed by the one or more SSDs during the first time period meets or exceeds a preset load threshold; (f) in accordance with the amount of memory operation requests not meeting or exceeding the preset load threshold, transferring a second percentage of the plurality of internal memory requests to the one or more SSDs during a second time period subsequent to the first time period; and (g) in accordance with the amount of memory operation requests meeting or exceeding the preset load threshold, forgoing transferring the second percentage of the plurality of internal memory requests to the one or more SSDs during the second time period.

(A10) In some implementations of the method of A9, the determination of the anticipated number of external requests is based on a number of external memory operation requests obtained during a prior time period. In some implementations, the time period is a day, an hour, a minute, or the like. In some implementations, the determination is based on a medium and/or mean number of external requests for the prior time period.

(A11) In some implementations of the methods of A9-A10: (1) the method further includes determining a maximum rate of processing memory operations for the one or more SSDs; and (2) transferring the percentage of the plurality of internal memory requests to the one or more SSDs during the first time period comprises selecting an amount of internal memory operation requests to be processed during the first time period based on the anticipated number of external requests and the maximum rate. In some implementations, the number of internal memory operation requests is set to be a percentage of the total number of operation requests to be processed during a time period. In some implementations, if the anticipated number of external requests meets or exceeds a maximum threshold for the external requests, the internal requests are set to a minimum amount. For example, the anticipated number of external requests equals 90% or more of the maximum for the time period and the internal memory operation requests are set to be 10%. In some implementations, if the anticipated number of external requests is less than the maximum threshold the internal requests are set to a higher amount. For example, the anticipated number of external requests equals 50% or more of the maximum for the time period and the internal memory operation requests are set to be 50%.

(A12) In some implementations of the methods of A9-A11, determining whether an amount of memory operation requests processed by the one or more SSDs during the first time period meets or exceeds a preset load threshold includes determining a total number of requests transferred to the one or more SSDs during the first time period.

(A13) In some implementations of the methods of A9-A12, the method further includes: (1) transferring a second plurality of external memory operation requests to the one or more SSDs during the second time period; (2) determining whether an amount of memory operation requests processed by the one or more SSDs during the second time period meets or exceeds the preset load threshold; (3) in accordance with the amount of memory operation requests not meeting or exceeding the preset load threshold, transferring a third percentage of the plurality of internal memory requests to the one or more SSDs during a third time period subsequent to the second time period; and (4) in accordance with the amount of memory operation requests meeting or exceeding the preset load threshold, forgoing transferring the third percentage of the plurality of internal memory requests to the one or more SSDs during the third time period.

Other implementations include a computing system including one or more processors and memory coupled to the one or more processors, the memory storing one or more programs configured to be executed by the one or more processors, the one or more programs including instructions for performing any of the methods described herein (e.g., A1-A13 described above).

Further implementations include a non-transitory computer-readable storage medium storing one or more programs for execution by one or more processors of a computing system, the one or more programs including instructions for performing any of the methods described herein (e.g., A1-A13 described above).

Thus, devices, storage mediums, and computing systems are provided with methods for balancing memory operation requests, thereby enhancing efficiency, latency, and user satisfaction with such systems. Such methods may complement or replace conventional methods for balancing memory operation requests.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
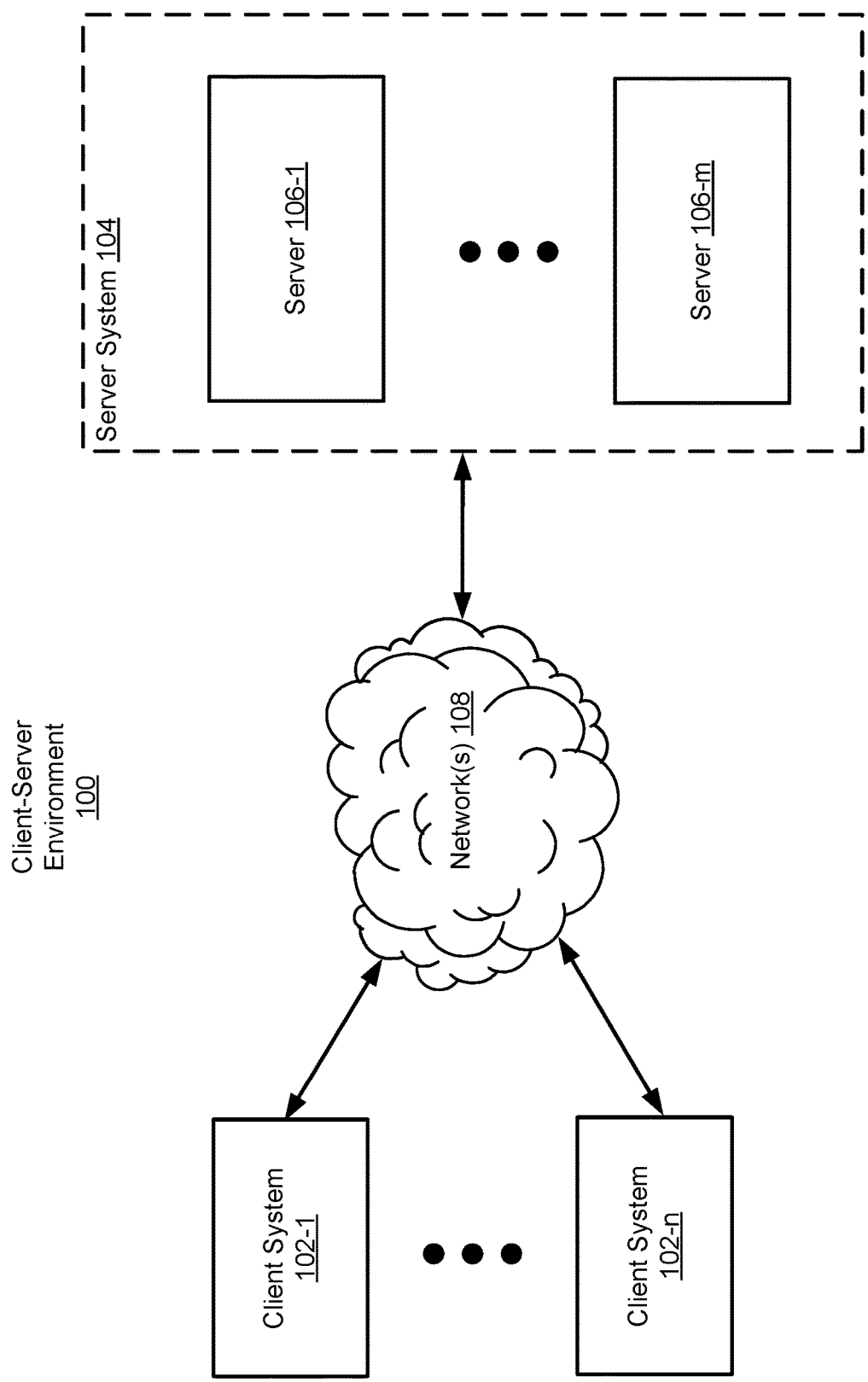
FIG. 1 illustrates a representative client-server environment, in accordance with some implementations.

FIG. 1 illustrates a representative client-server environment 100, in accordance with some implementations. The client-server environment 100 includes a plurality of client systems 102, client 102-1 through client system 102-n, communicatively coupled to a server system 104 via one or more network(s) 108. In some instances and implementations, only a single client system 102 (e.g., client system 102-1) is coupled to the server system 104. In some implementations, the server system 104 includes a plurality of storage servers 106, storage server 106-1 through storage server 106-m. In some implementations, the server system 104 includes only a single storage server 106-1. In some implementations, the client systems 102 issue data read and write commands to the server system 104. In some implementations, the client systems 102 issue the commands to a particular storage server 106. In some implementations, the server system 104 determines which storage server 106 should process the commands (e.g., which storage server 106 contains the data to be read). In some implementations, the server system 104 determines the appropriate storage server 106 based at least in part on load balancing.

Other operations that the client systems 102 may issue, include, but are not limited to: an operation to delete data stored on a storage server, an operation to update data stored on a target server, an operation to perform a search query, and any operations involving data. Note that the term "data" is used in this specification to include any type of data (e.g., binary, text, etc.) and also includes metadata (e.g., data about the data).

In some implementations, the server system 104 is a distributed storage system. In some implementations, a respective storage server is a storage node in a storage cluster of a distributed storage system. In some implementations, the respective storage server is a local server (e.g., in the same data center, the same building, and/or the same geographic location, etc., as the client system). In some implementations, the respective storage server is a remote server (e.g., in a different data center, different building, and/or different geographic location, etc., as the client system).

A respective client system 102 includes, but is not limited to, a desktop computer system, a laptop computer system, a smart phone, a mobile phone, a tablet computer system, a server, a game console, a set top box, a television set, and any device that can transmit and/or receive data via network 108.

Network 108 optionally includes any type of wired or wireless communication channel capable of coupling together computing systems. This includes, but is not limited to, a local area network, a wide area network, or a combination of networks. In some implementations, network 108 includes the Internet.

In some implementations, a particular storage server 106 (e.g., storage system 106-1) includes a plurality of distributed storage devices. The distributed storage devices may be located within a single location (e.g., a data center, a building, etc.) or may be geographically distributed across multiple locations (e.g., data centers at various geographical locations, etc.).

Figure 2:
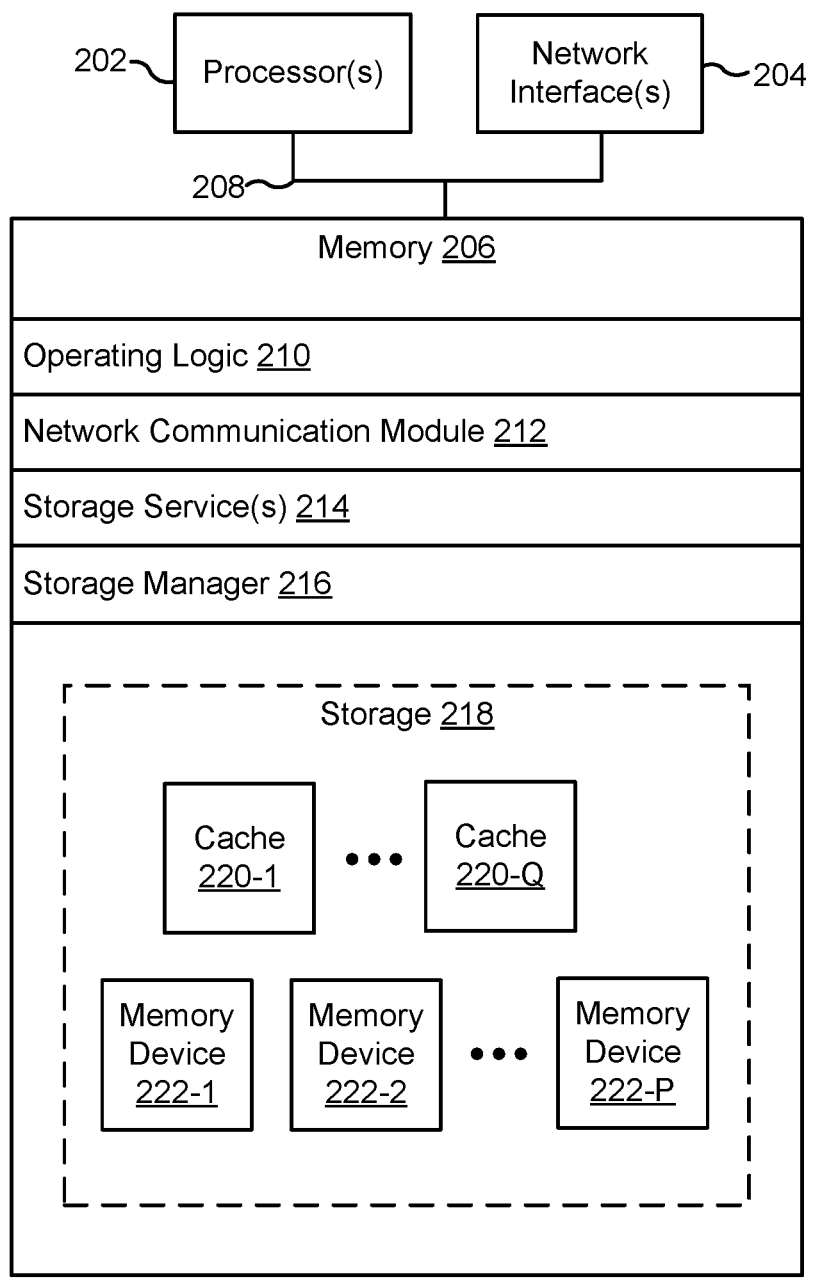
FIG. 2 is a block diagram illustrating a representative storage server, in accordance with some implementations.

FIG. 2 is block diagram illustrating a representative storage server 106, in accordance with some implementations. In some implementations, the storage server 106 includes one or more processing units (e.g., CPUs, ASICs, FPGAs, microprocessors, and the like) 202, one or more network interface(s) 204, memory 206, and one or more communication buses 208 for interconnecting these components (sometimes called a chipset).

In some implementations, the storage server 106 includes a user interface (not shown). In some implementations, the user interface includes one or more output devices that enable presentation of media content, including one or more speakers and/or one or more visual displays. In some implementations, the user interface also includes one or more input devices, including user interface components that facilitate user input such as a keyboard, a mouse, a voice-command input unit or microphone, a touch screen display, a touch-sensitive input pad, a gesture capturing camera, or other input buttons or controls.

The network interface(s) 204 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.), and/or any of a variety of custom or standard wired protocols (e.g., Ethernet, HomePlug, etc.), or any other suitable communication protocol, including communication protocols not yet developed as of the filing date of this document.

The memory 206 includes volatile memory (e.g., high-speed random access memory), such as DRAM, SRAM, DDR SRAM, or other random access solid state memory devices. The memory 206 further includes non-volatile memory, such as one or more magnetic disk storage devices, one or more optical disk storage devices, one or more flash memory devices, or one or more other non-volatile solid state storage devices. The memory 206, or alternatively the non-volatile memory within the memory 206, includes a non-transitory computer-readable storage medium. In some implementations, the memory 206, or the non-transitory computer readable storage medium of the memory 206, stores the following programs, modules, and data structures, or a subset or superset thereof:

operating logic 210 including procedures for handling various basic system services and for performing hardware dependent tasks;

a network communication module 212 for coupling the storage server 106 to other devices (e.g., storage devices, servers, network devices, and/or clients 102) via the network interface(s) 204;

one or more storage services 214 for execution by the storage server 106 (e.g., services for garbage collection, data redundancy, caching, snapshotting, mirroring, and the like);

a storage manager 216 for governing access to the storage 218 including processing external memory operation requests and internal memory operation requests, and/or governing caching of data within the storage server 106; and storage 218 for storing data (e.g., client data, metadata, redundancy data, etc.) within the storage server 106, including, but not limited to:
one or more memory caches 220 for caching data within the storage server 106; and
one or more memory devices 222 (e.g., HDDs, SSDs, flash devices, etc.).

In some implementations, a respective cache 220 includes volatile memory (e.g., RAM). In some implementations, a respective cache 220 includes both volatile and non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 206, optionally, stores a subset of the modules and data structures identified above. Furthermore, the memory 206, optionally, stores additional modules and data structures not described above. For example, in some implementations, the memory 206 stores an input/output processing module for facilitating interactions with one or more users.

Figure 3:
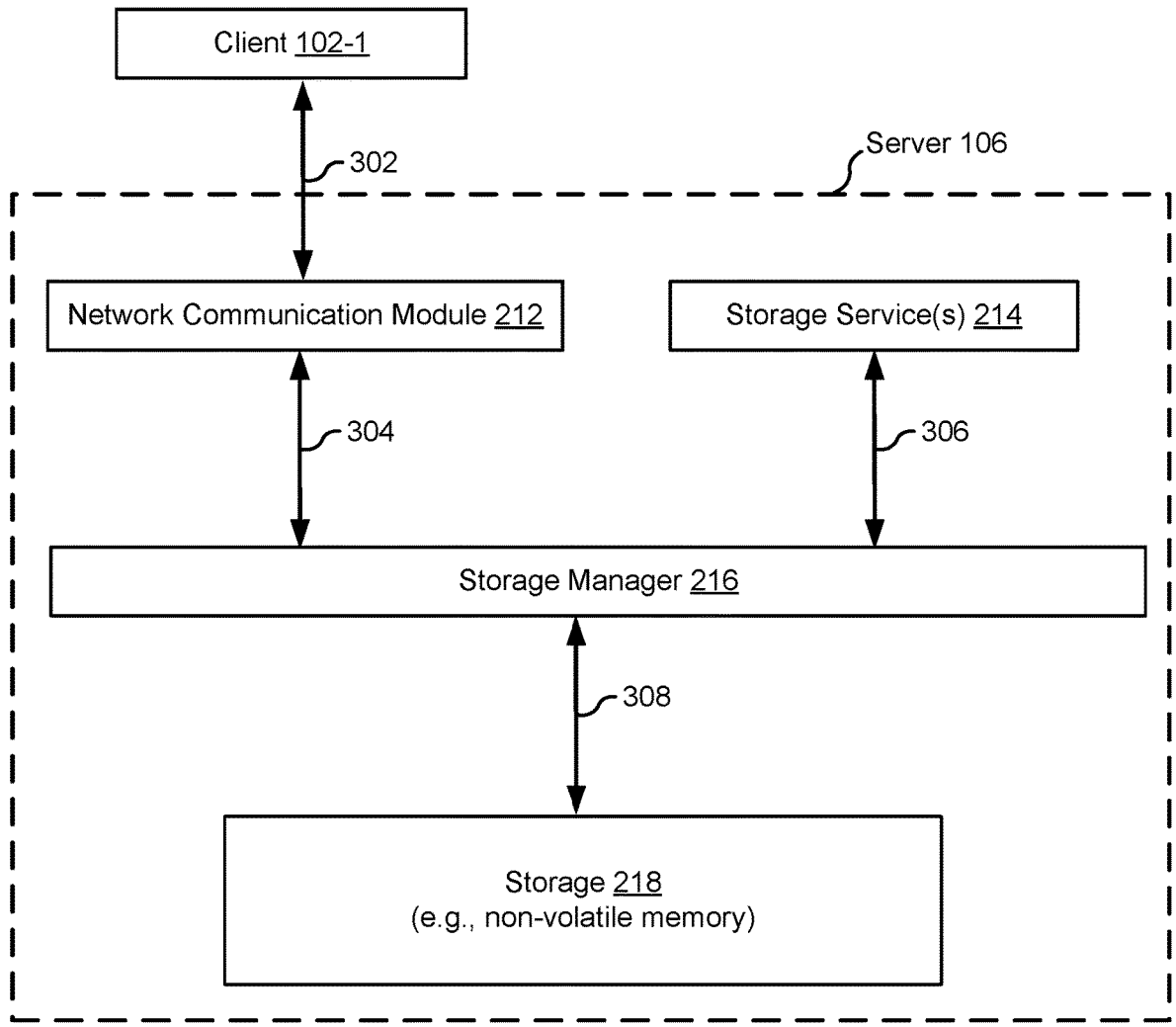
FIG. 3 is a block diagram illustrating a representative memory request flow, in accordance with some implementations.

FIG. 3 is a block diagram illustrating a representative memory request flow, in accordance with some implementations. As shown in FIG. 3, external memory operation requests 302 may originate at a client 102-1 and are received via a network communication module 212 of the server 106. Additionally, internal memory operation requests 306 are generated by the storage service(s) 214 of the server 106. Both the external memory operation requests 302 and the internal memory operation requests 306 are received by the storage manager 216. In accordance with some implementations, the storage manager 216 balances the internal and external memory operation requests and sends a combination of the internal and external memory operation requests 308 to the storage 218 (e.g., at different rates).

FIGS. 4A-4K are block diagrams illustrating a process of batching memory operation requests, in accordance with some implementations. Although FIGS. 4A-4K show the storage as an HDD 402, in some implementations, the storage comprises other types of non-volatile memory.

Figure 4A:
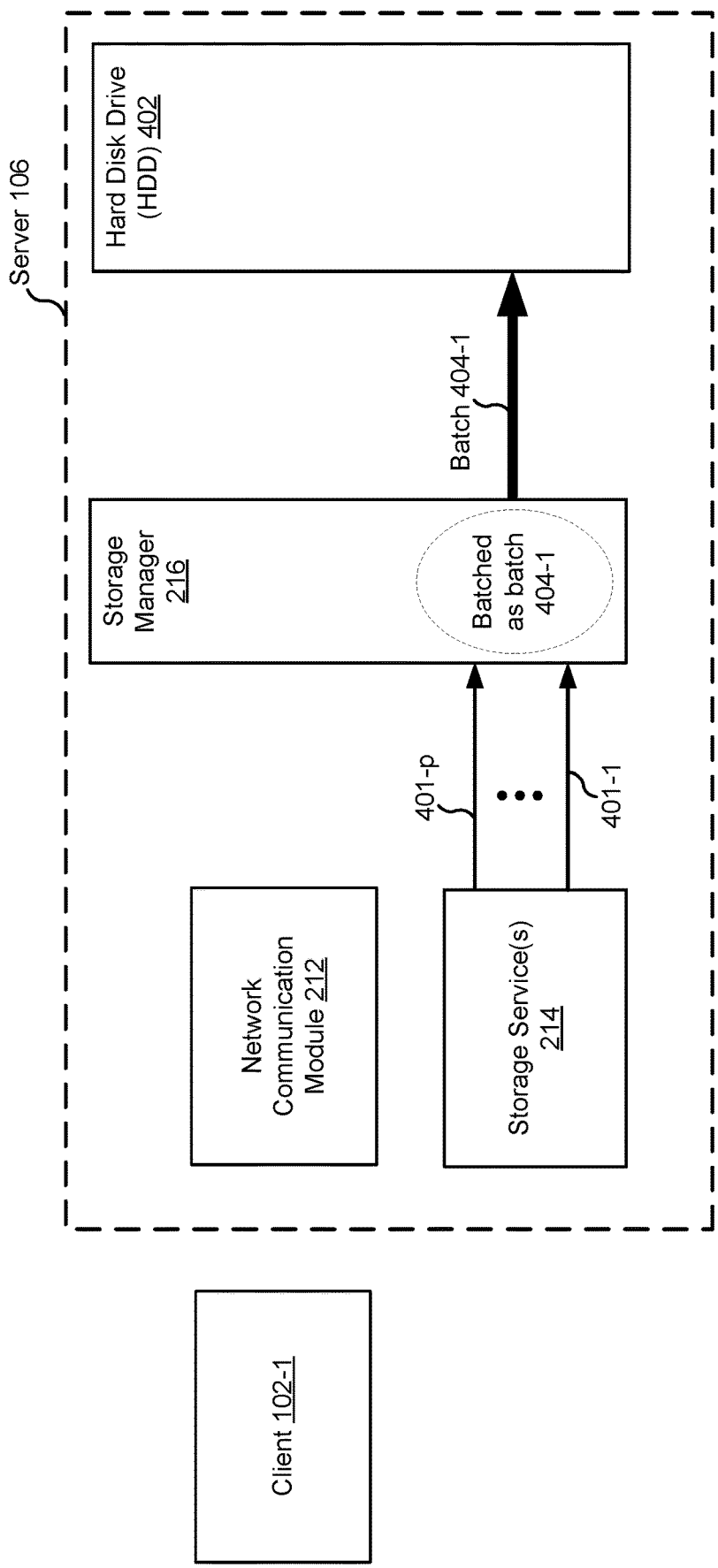
FIGS. 4A-4K are block diagrams illustrating a process of batching memory operation requests, in accordance with some implementations.

FIGS. 4A-4F show processing of a first batch of internal and external memory operation requests. FIG. 4A shows the client 102-1 and server 106 at a first time, with internal memory operation requests 401 (e.g., 401-1 through 401-$p$) sent from the storage service(s) 214 to the storage manager 216. FIG. 4A further shows the internal memory operation requests 401 batched at the storage manager 216 as batch 404-1 and sent to the HDD 402.

Figure 4B:
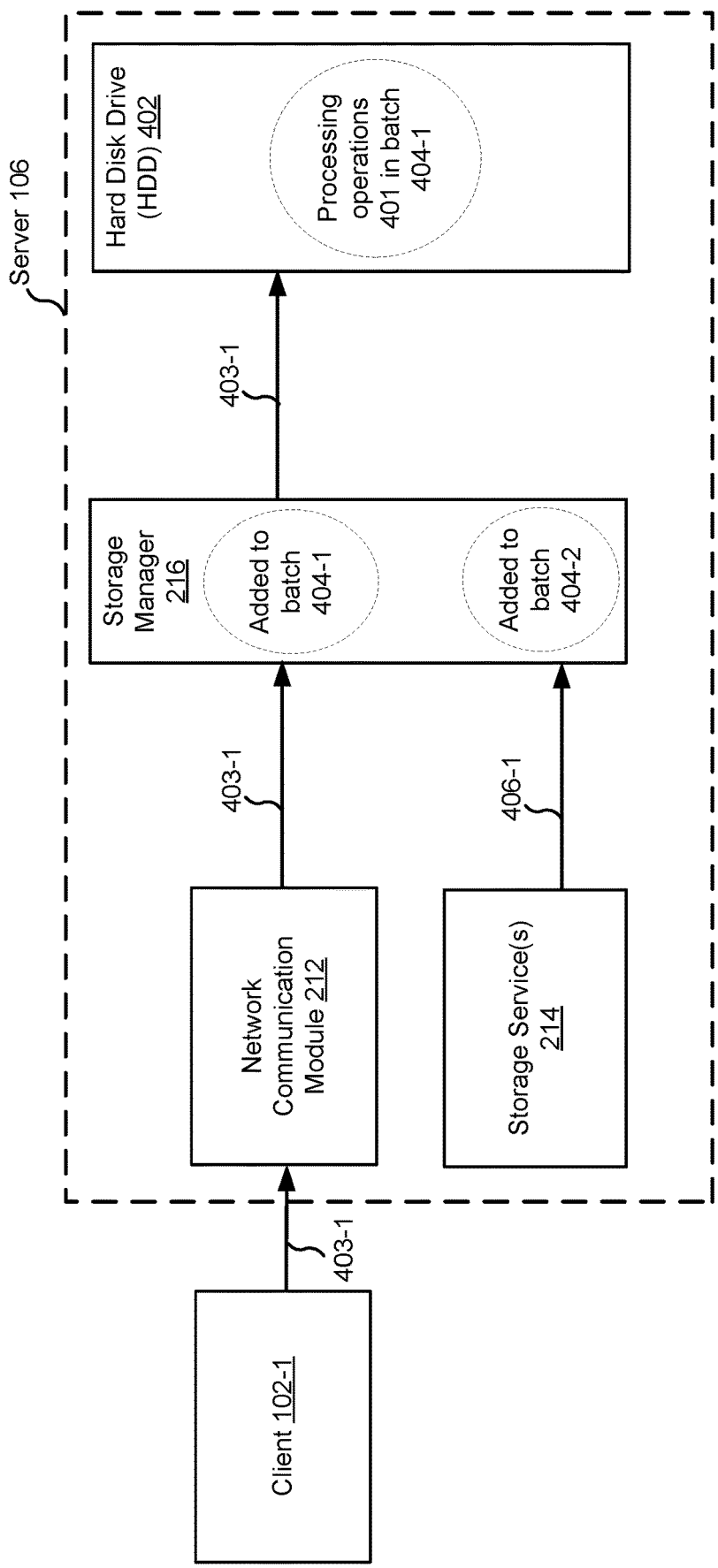

FIG. 4B shows the client 102-1 and server 106 at a second time, subsequent to the first time. At the second time, the HDD 402 is processing the operations 401 in the batch 404-1, an external memory operation request 403-1 is sent from the client 102-1 to the storage manager 216 via the network communication module 212, and an internal memory operation request 406-1 is sent from the storage service(s) 214 to the storage manager 216. FIG. 4B further shows the external memory operation request 403-1 added to the batch 404-1 and sent to the HDD 402 and the internal memory operation request 406-1 added to a new batch 404-2 (and not sent to the HDD 402).

Figure 4C:
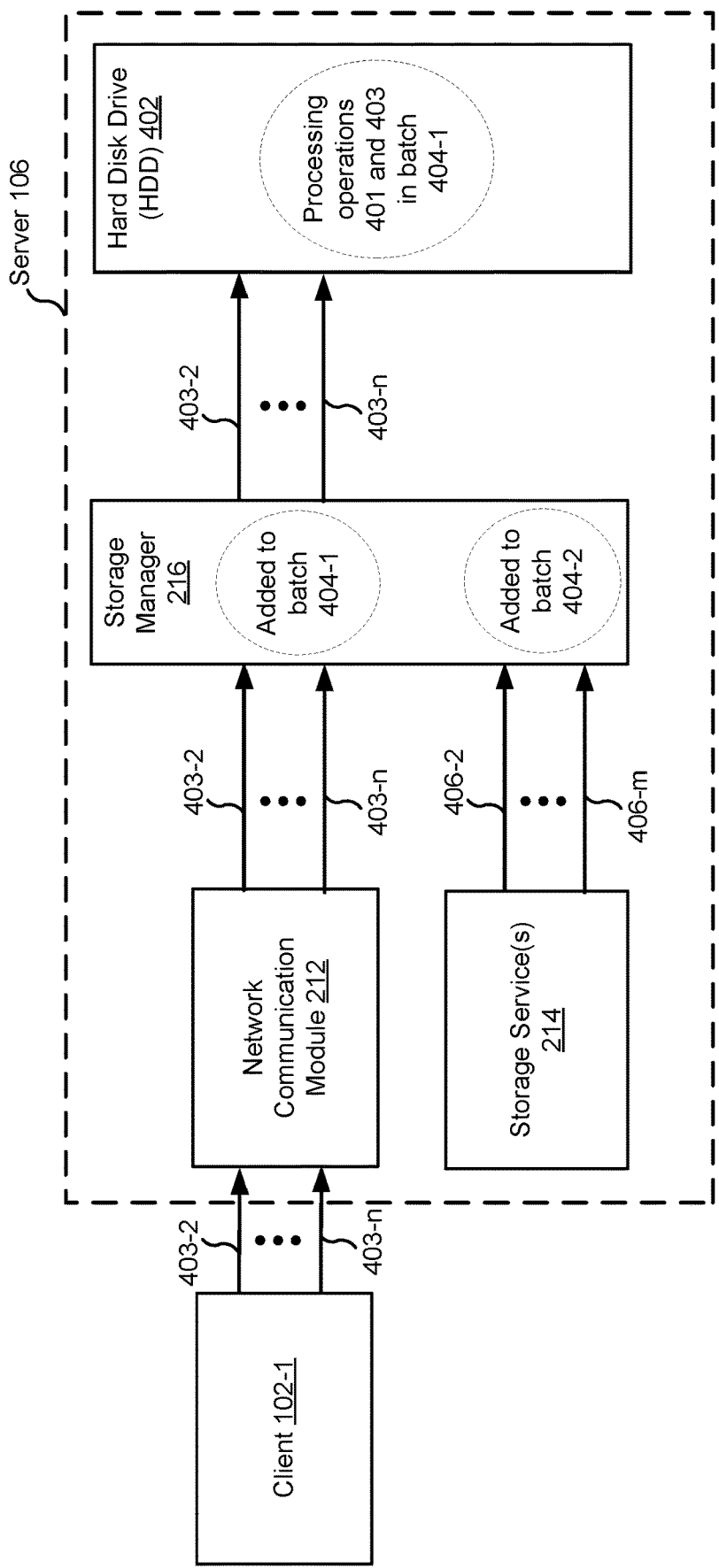

FIG. 4C shows the client 102-1 and server 106 at a third time, subsequent to the second time. At the third time, the HDD 402 is processing the operations 401, 403 in the batch 404-1, external memory operation requests 403-2 through 403-$n$ are sent from the client 102-1 to the storage manager 216 via the network communication module 212, and internal memory operation requests 406-2 through 406-$m$ are sent from the storage service(s) 214 to the storage manager 216. FIG. 4C further shows the external memory operation requests 403 added to the batch 404-1 and sent to the HDD 402 and the internal memory operation requests 406 added to the batch 404-2 (and not sent to the HDD 402).

Figure 4D:
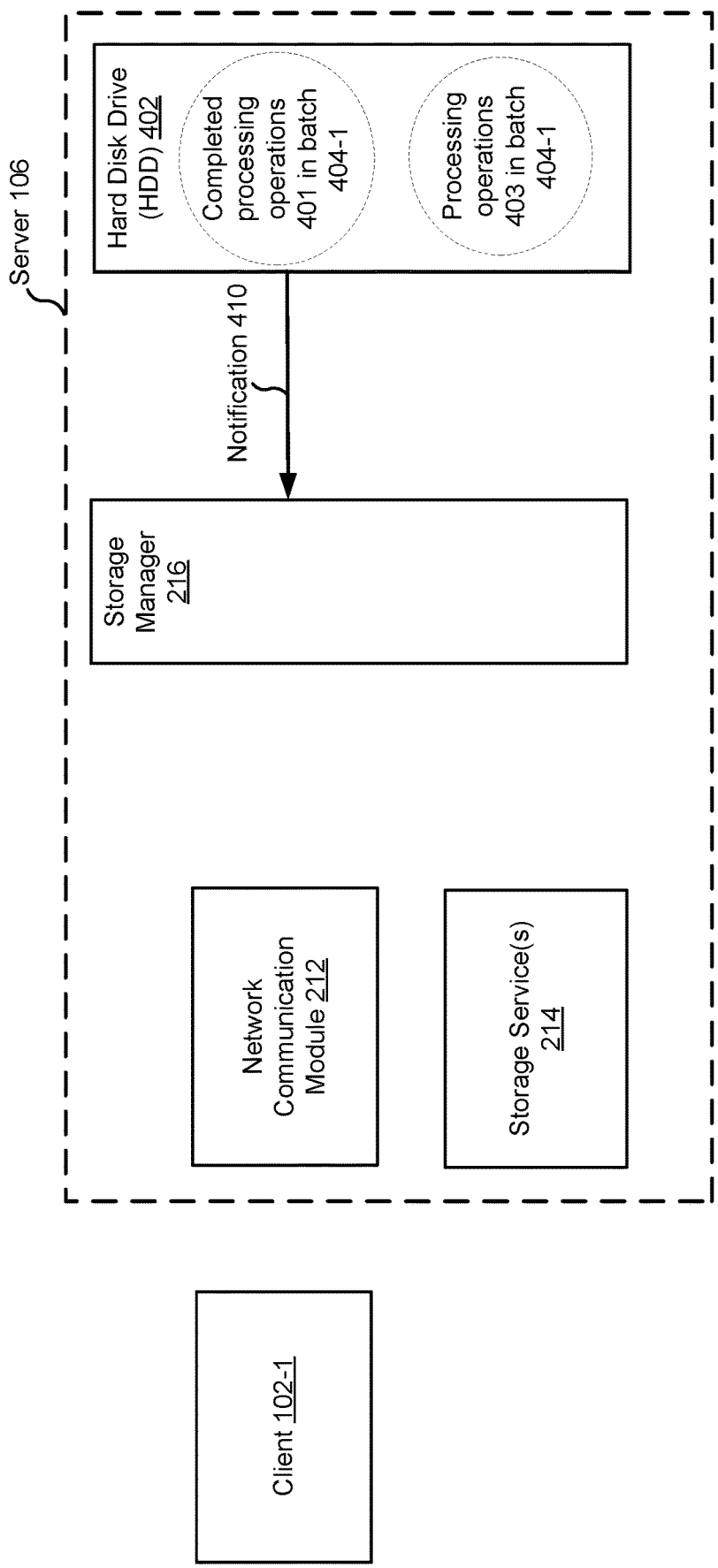

FIG. 4D shows the client 102-1 and server 106 at a fourth time, subsequent to the third time. At the fourth time, the HDD 402 has completed processing the operations 401 in the batch 404-1 and has sent a corresponding notification 410 to the storage manager 216. FIG. 4D also shows the HDD 402 continuing to process the operations 403 in the batch 404-1.

Figure 4E:
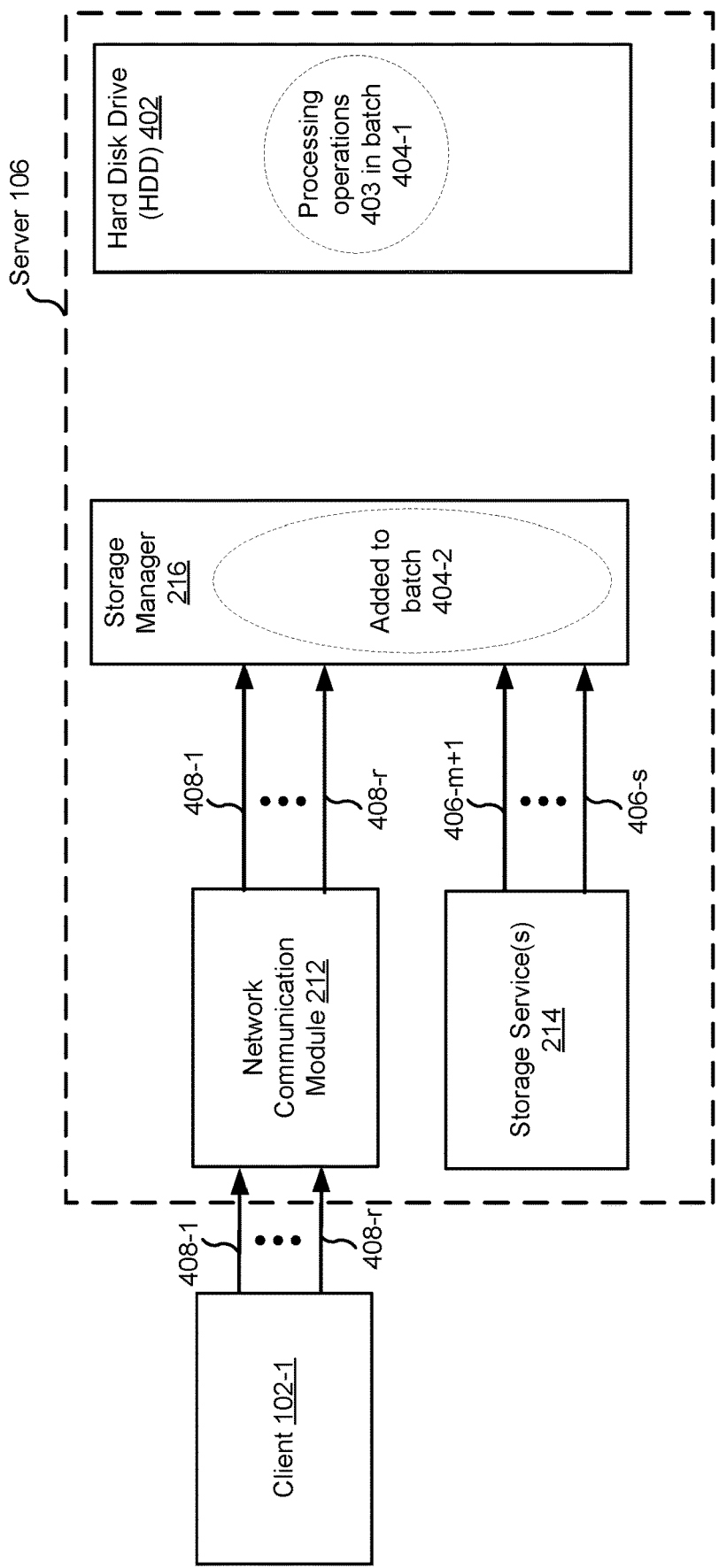

FIG. 4E shows the client 102-1 and server 106 at a fifth time, subsequent to the fourth time. At the fifth time, the HDD 402 is processing the operations 403 in the batch 404-1, external memory operation requests 408 are sent from the client 102-1 to the storage manager 216 via the network communication module 212, and internal memory operation requests 406 (e.g., internal memory operation requests 406-$m$+1 through 406-$s$) are sent from the storage service(s) 214 to the storage manager 216. FIG. 4E further shows the external memory operation requests 408 and the internal memory operation requests 406 added to the batch 404-2 (and not sent to the HDD 402).

Figure 4F:
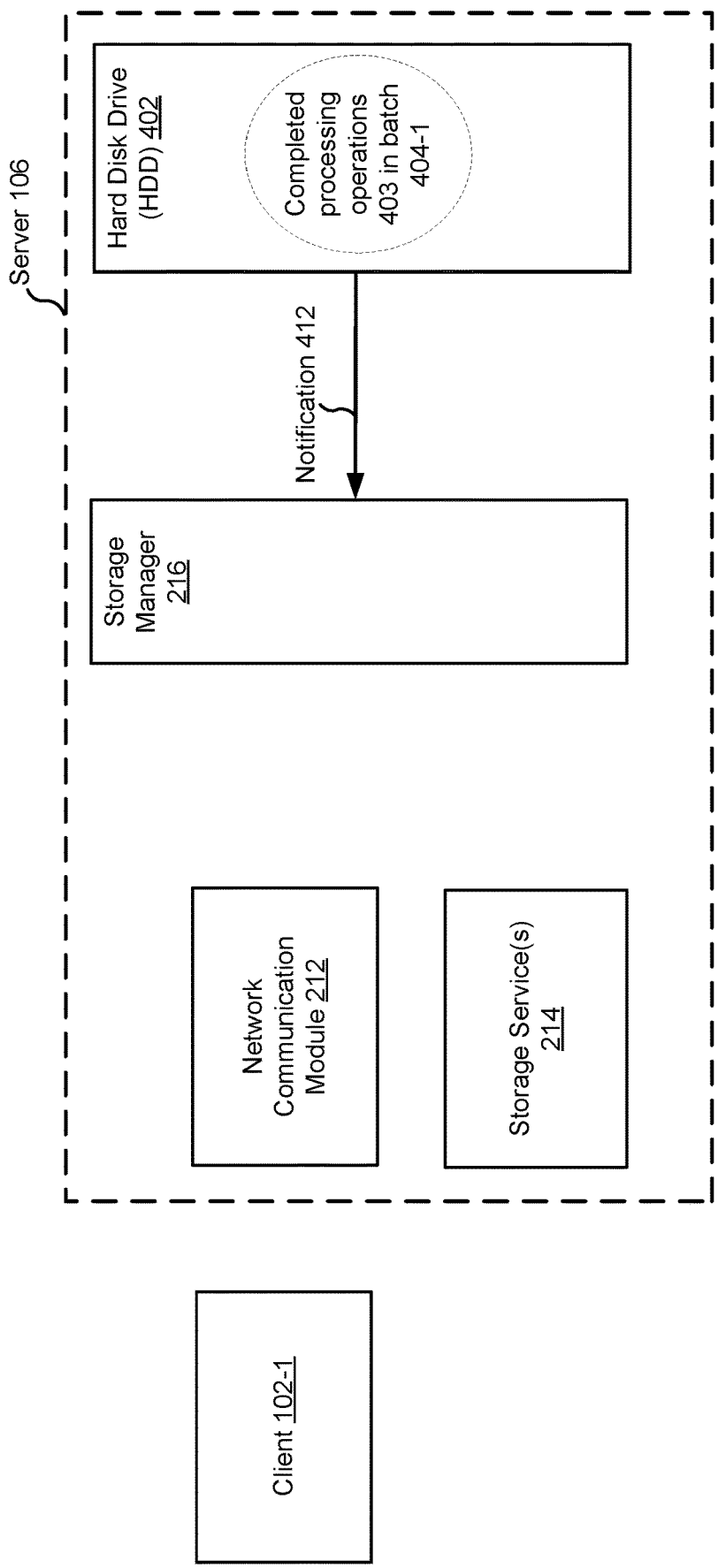

FIG. 4F shows the client 102-1 and server 106 at a sixth time, subsequent to the fifth time. At the sixth time, the HDD 402 has completed processing the operations 403 in the batch 404-1 (e.g., has completed processing all operations in the batch 404-1) and has sent a corresponding notification 412 to the storage manager 216.

Figure 4G:
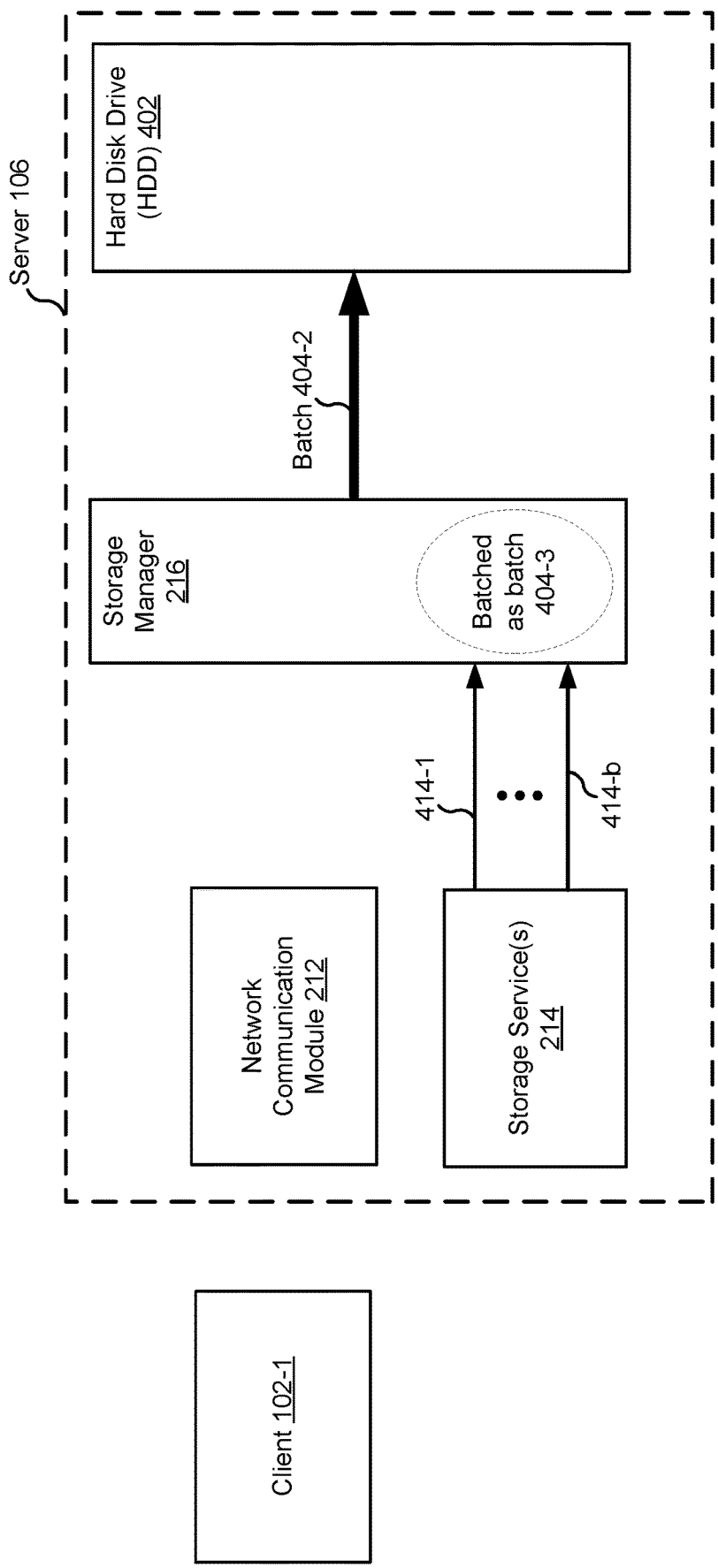

FIGS. 4G-4K show processing of a second batch of internal and external memory operation requests. FIG. 4G shows the client 102-1 and server 106 at a seventh time, with batch 404-2 sent from the storage manager 216 to the HDD 402. FIG. 4G further shows internal memory operation requests 414 (e.g., internal memory operation requests 414-1 through 414-$b$) sent from the storage service(s) 214 to the storage manager 216, where the internal memory operation requests are added to a new batch 404-3 (and not sent to the HDD 402).

Figure 4H:
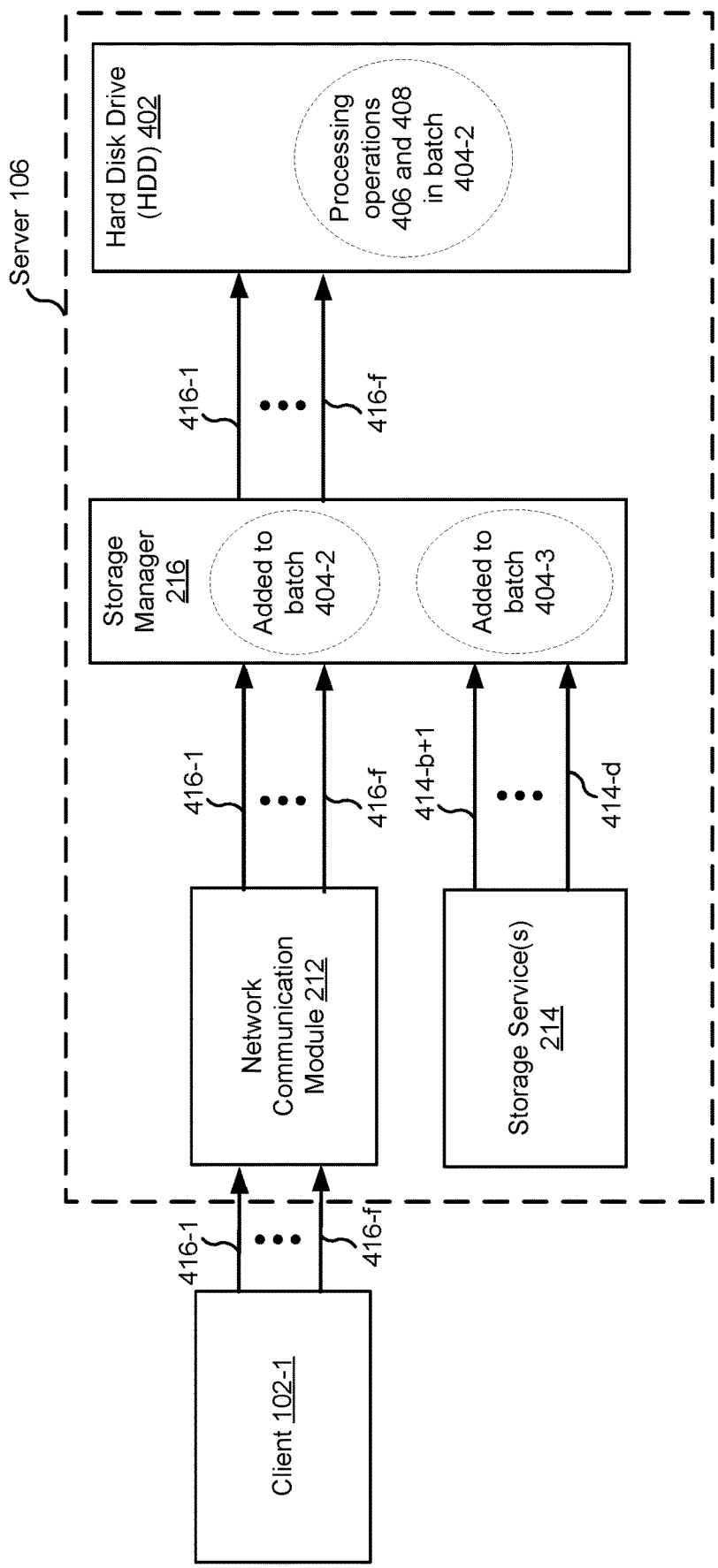

FIG. 4H shows the client 102-1 and server 106 at an eighth time, subsequent to the seventh time. At the eighth time, the HDD 402 is processing the operations 406 and 408 in the batch 404-2, external memory operation requests 416 (e.g., external memory operation requests 416-1 through 416-$f$) are sent from the client 102-1 to the storage manager 216 via the network communication module 212, and internal memory operation requests 414 (e.g., internal memory operation requests 414-*b*+1 through 414-*d*) are sent from the storage service(s) 214 to the storage manager 216. FIG. 4H further shows the external memory operation requests 416 added to the batch 404-2 and sent to the HDD 402 and the internal memory operation requests 414 added to the batch 404-3 (and not sent to the HDD 402).

Figure 4I:
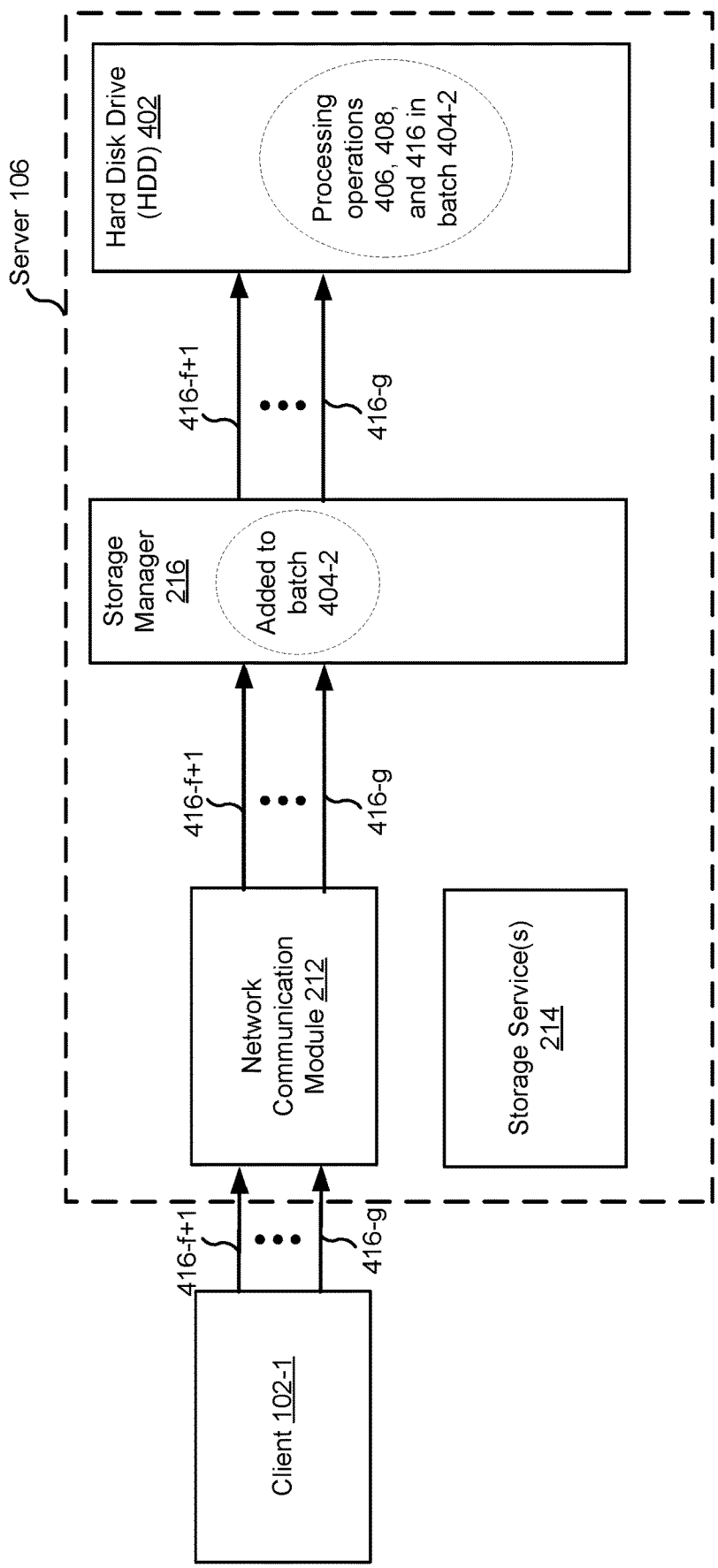

FIG. 4I shows the client 102-1 and server 106 at a ninth time, subsequent to the eighth time. At the ninth time, the HDD 402 is processing the operations 406, 408, and 416 in the batch 404-2 and external memory operation requests 416 (e.g., external memory operation requests 416-*f*+1 through 416-*g*) are sent from the client 102-1 to the storage manager 216 via the network communication module 212. FIG. 4I further shows the external memory operation requests 416 added to the batch 404-2 and sent to the HDD 402.

Figure 4J:
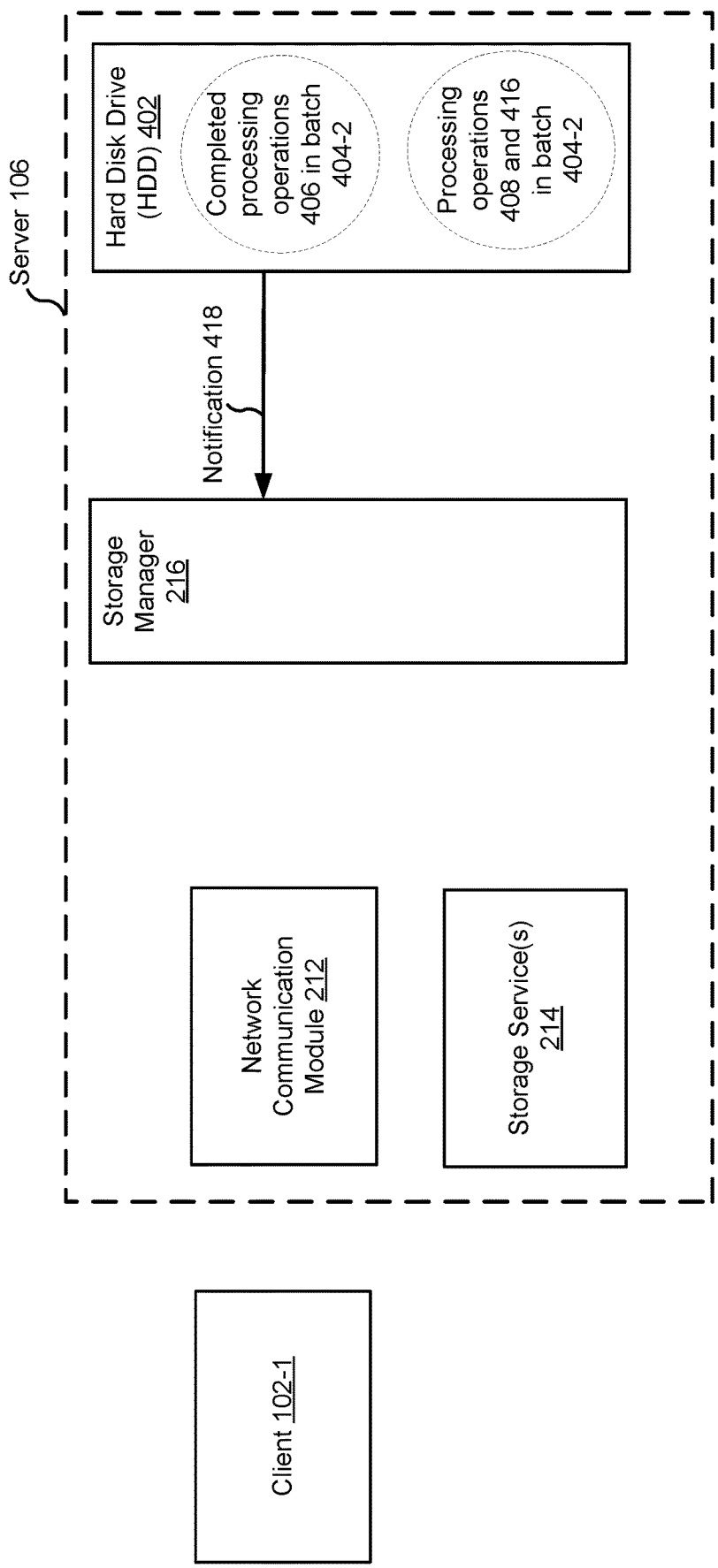

FIG. 4J shows the client 102-1 and server 106 at a tenth time, subsequent to the ninth time. At the tenth time, the HDD 402 has completed processing the operations 406 in the batch 404-2 and has sent a corresponding notification 418 to the storage manager 216. FIG. 4J also shows the HDD 402 continuing to process the operations 408 and 416 in the batch 404-2.

Figure 4K:
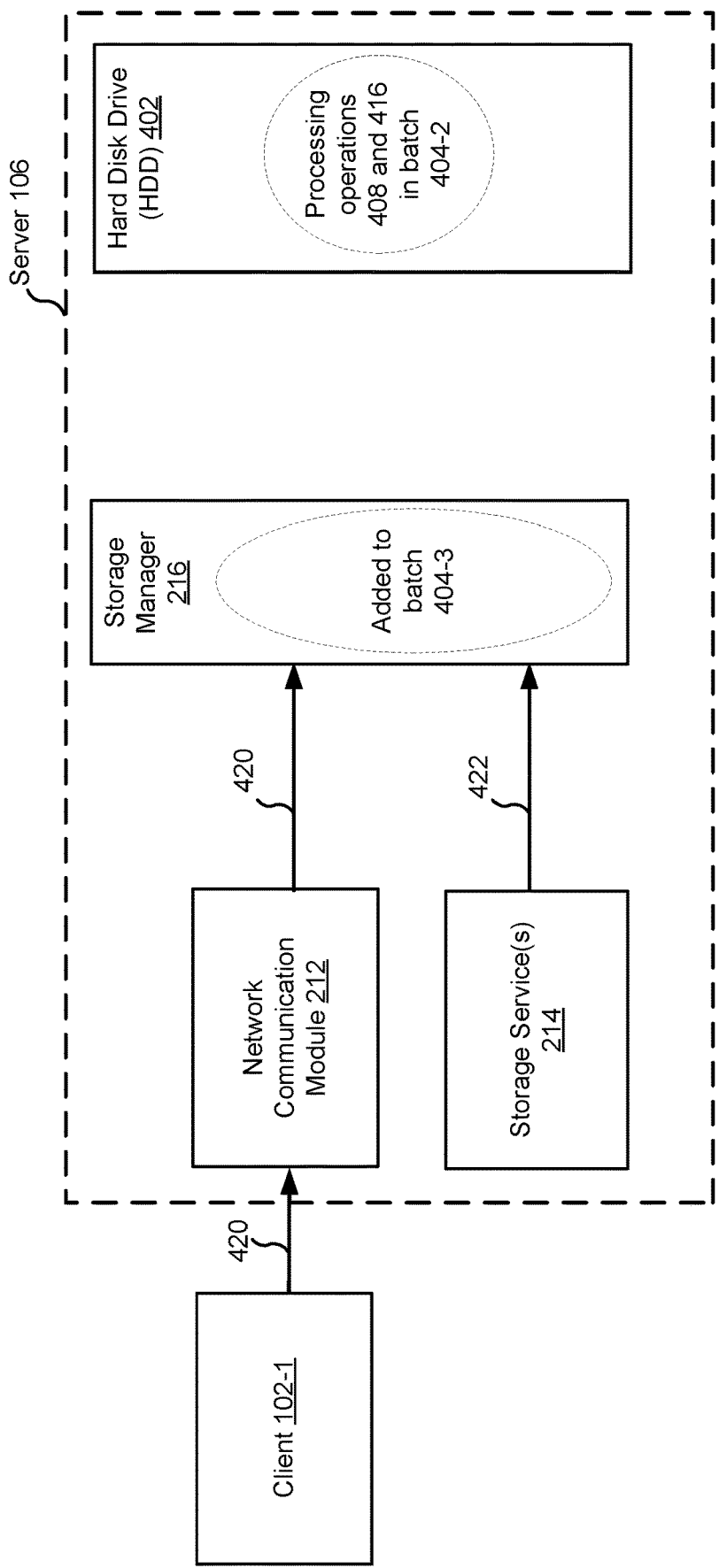

FIG. 4K shows the client 102-1 and server 106 at an eleventh time, subsequent to the tenth time. At the eleventh time, the HDD 402 is processing the operations 408 and 416 in the batch 404-2, an external memory operation request 420 is sent from the client 102-1 to the storage manager 216 via the network communication module 212, and an internal memory operation request 422 is sent from the storage service(s) 214 to the storage manager 216. FIG. 4K further shows the external memory operation request 420 and the internal memory operation request 422 added to the batch 404-3 (and not sent to the HDD 402).

Thus, as shown in FIGS. 4A-4K, in some implementations, the storage manager batches internal memory operation requests (e.g., as a first batch) and adds external memory operation requests received while the storage is processing the internal memory operation requests to the batch being processed (e.g., the first batch). The storage manager adds subsequent internal memory operation requests to a next batch (e.g., a second batch) and adds external memory operation requests received after the storage completes processing the internal memory operation requests in the batch being processed to the next batch (e.g., the second batch). In this way, the storage manager ensures that internal memory operation requests do not consume all the I/O capabilities of the storage.

Figure 5A:
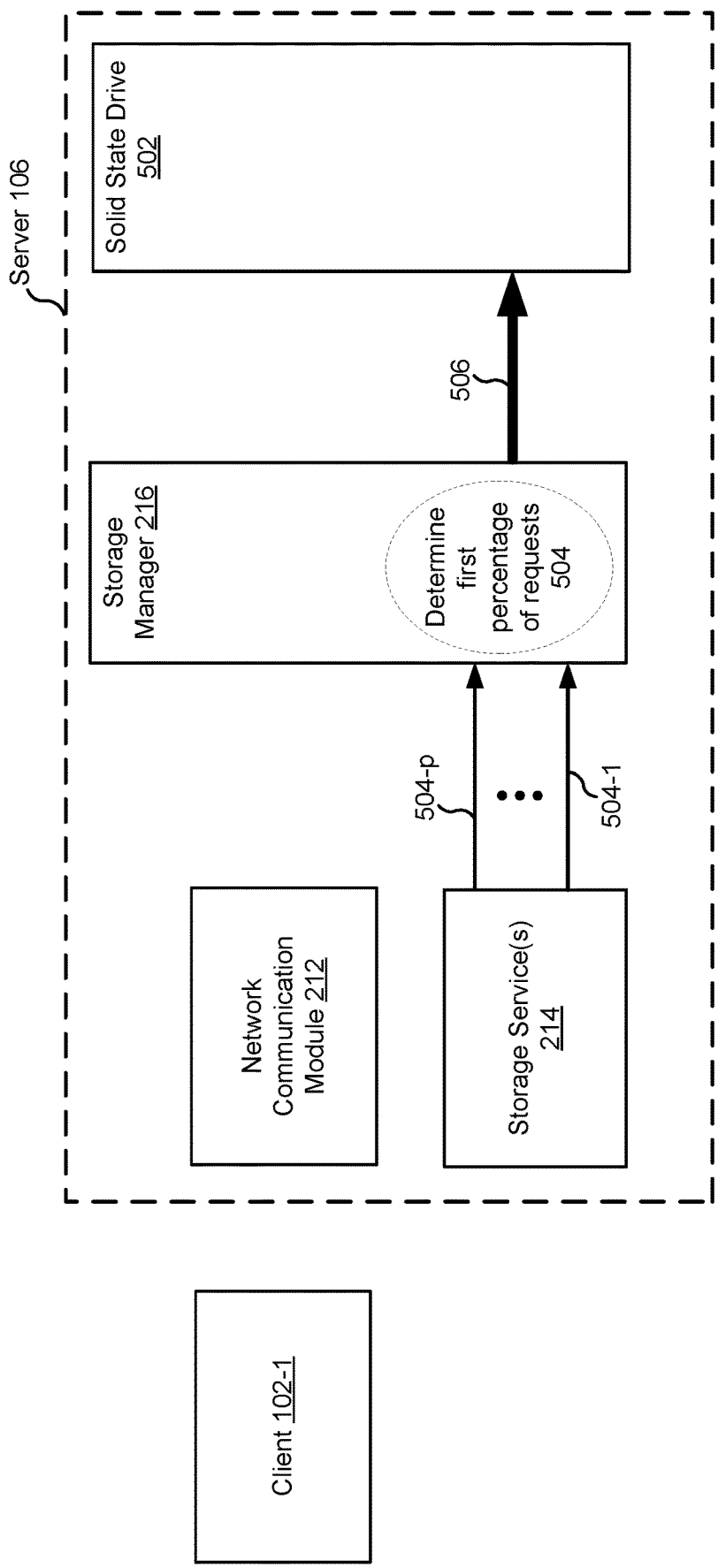
FIGS. 5A-5C are block diagrams illustrating a process of balancing memory operation requests, in accordance with some implementations.
Figure 5B:
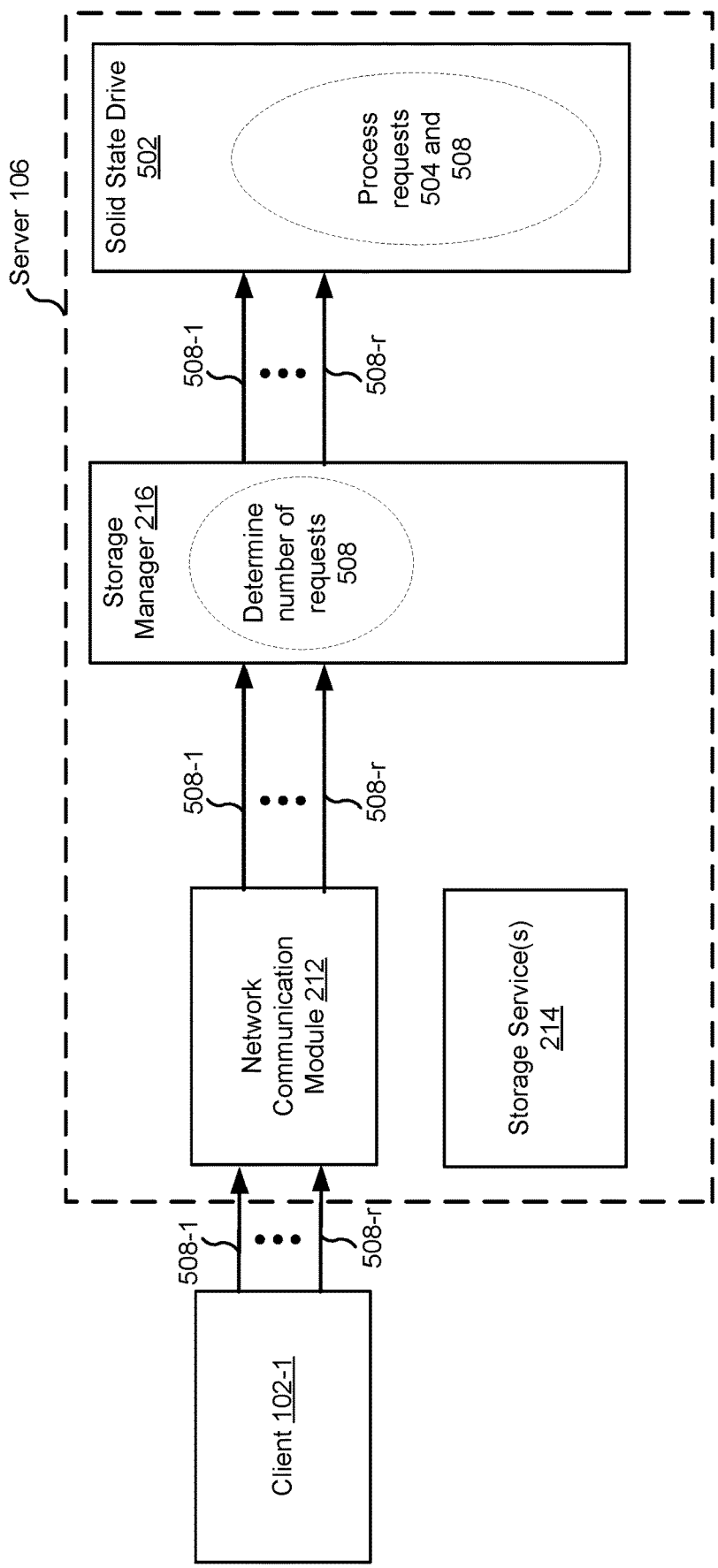
Figure 5C:
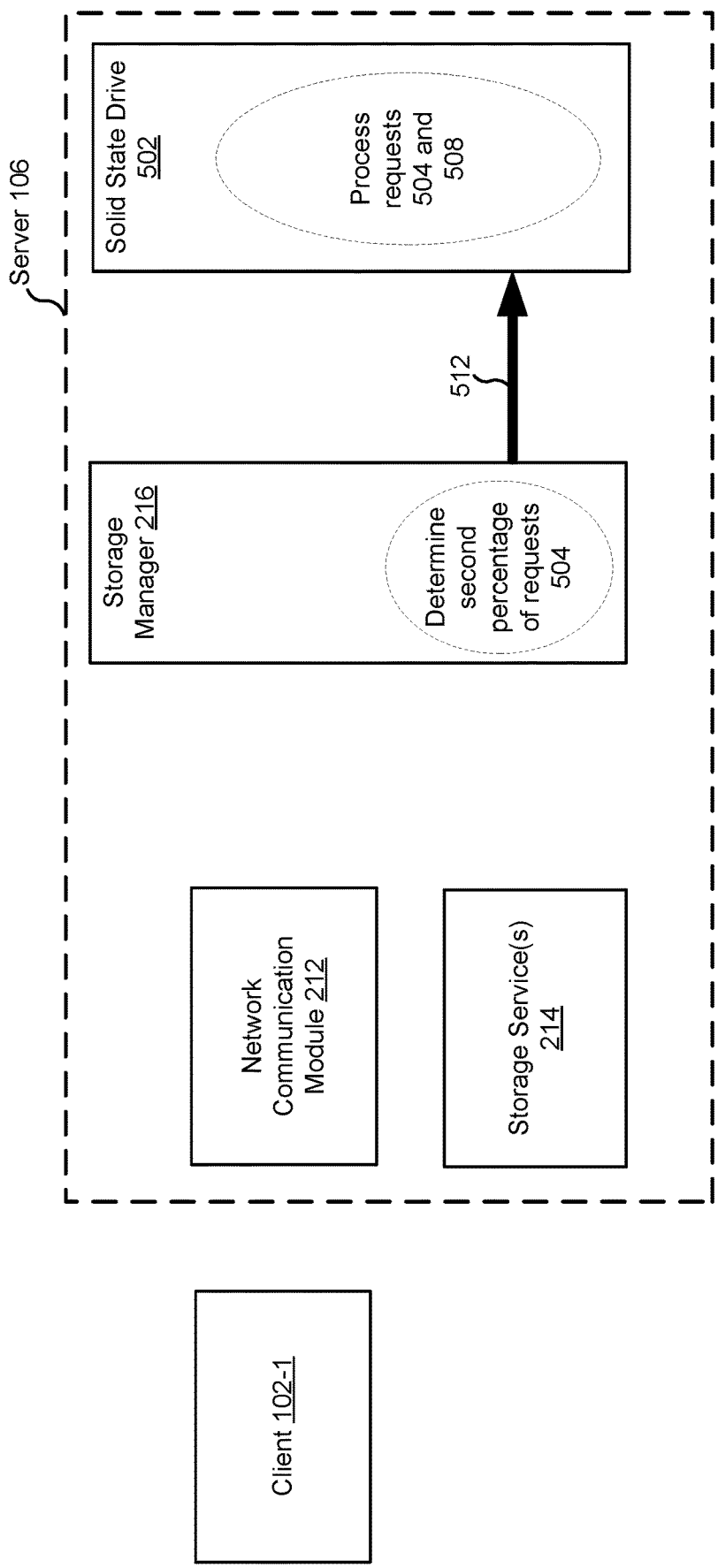

FIGS. 5A-5C are block diagrams illustrating a process of balancing memory operation requests, in accordance with some implementations. Although FIGS. 5A-5C show the storage as an SSD 502, in some implementations, the storage comprises other types of memory (e.g., flash memory).

FIG. 5A shows the client 102-1 and server 106 at a first time, with internal memory operation requests 504 (e.g., 504-1 through 504-*p*) sent from the storage service(s) 214 to the storage manager 216. FIG. 5A further shows the storage manager 216 determining a first percentage 506 of the requests 504 to send to the SSD 502 (e.g., based on an estimate of the number of incoming external memory operation requests expected to be received).

FIG. 5B shows the client 102-1 and server 106 at a second time, subsequent to the first time. At the second time, external memory operation requests 508 (e.g., 508-1 through 508-*r*) are sent from the client 102-1 to the storage manager 216 via the network communication module 212. FIG. 5B further shows the storage manager 216 determining that the amount of requests 508 is 'r' and sending the request 508 to the SSD 502.

FIG. 5C shows the client 102-1 and server 106 at a third time, subsequent to the second time. At the third time, the storage manager 216 determines a second percentage 512 of the requests 504 to send to the SSD 502 (e.g., based the number 'r' of incoming external memory operation requests received).

Thus, as shown in FIGS. 5A-5C, in some implementations, the storage manager modulates an amount of internal memory operation requests sent to the storage based on an expected number of external memory operation requests to be received in a next time interval and/or an actual number of external memory operation requests received in a prior time interval. In this way, the storage manager inhibits the internal memory operation requests from consuming all the I/O capabilities of the storage.

Representative Processes

Figure 6A:
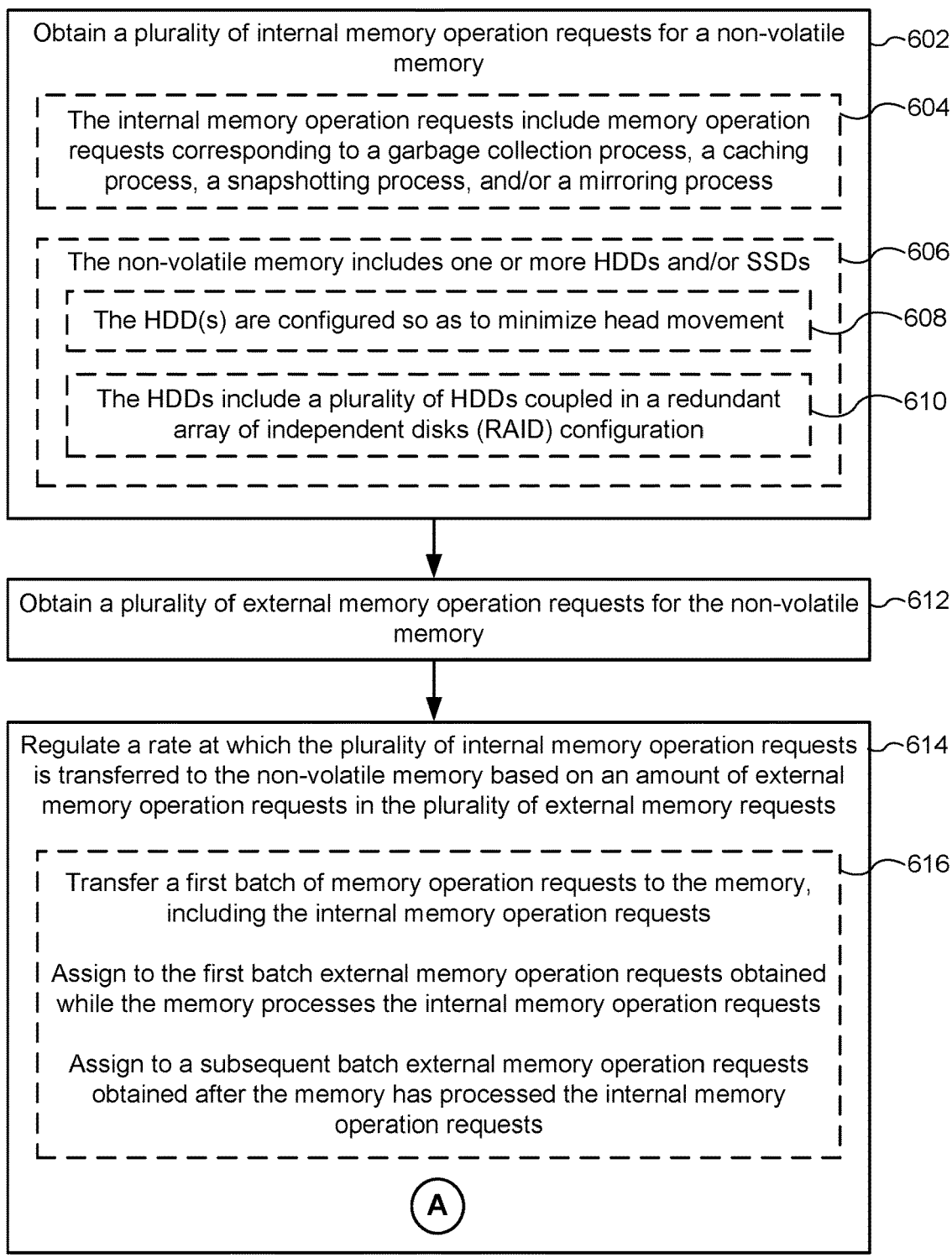
FIGS. 6A-6C are flowcharts illustrating a representative method for processing memory operation requests, in accordance with some implementations.
Figure 6B:
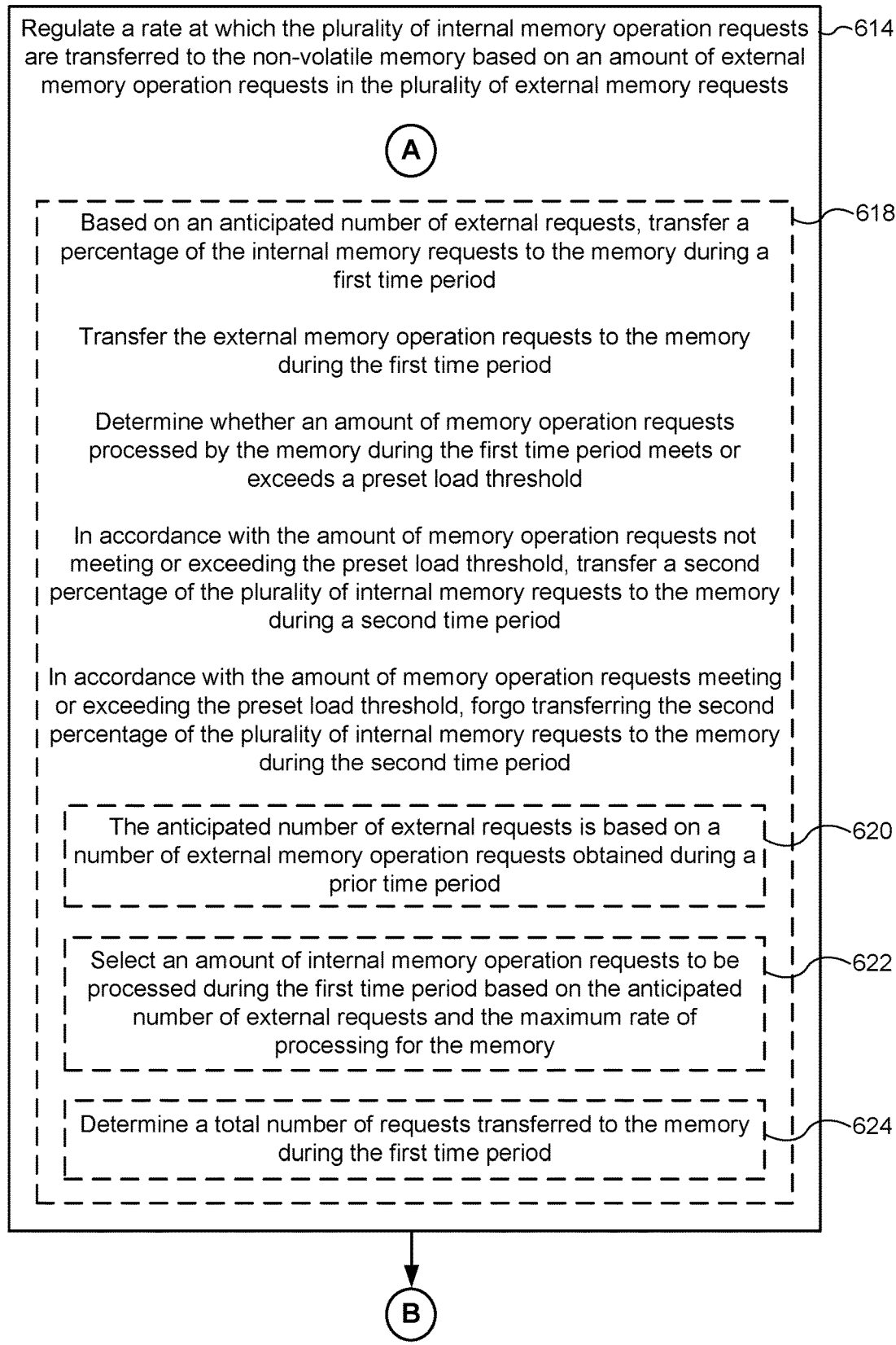
Figure 6C:
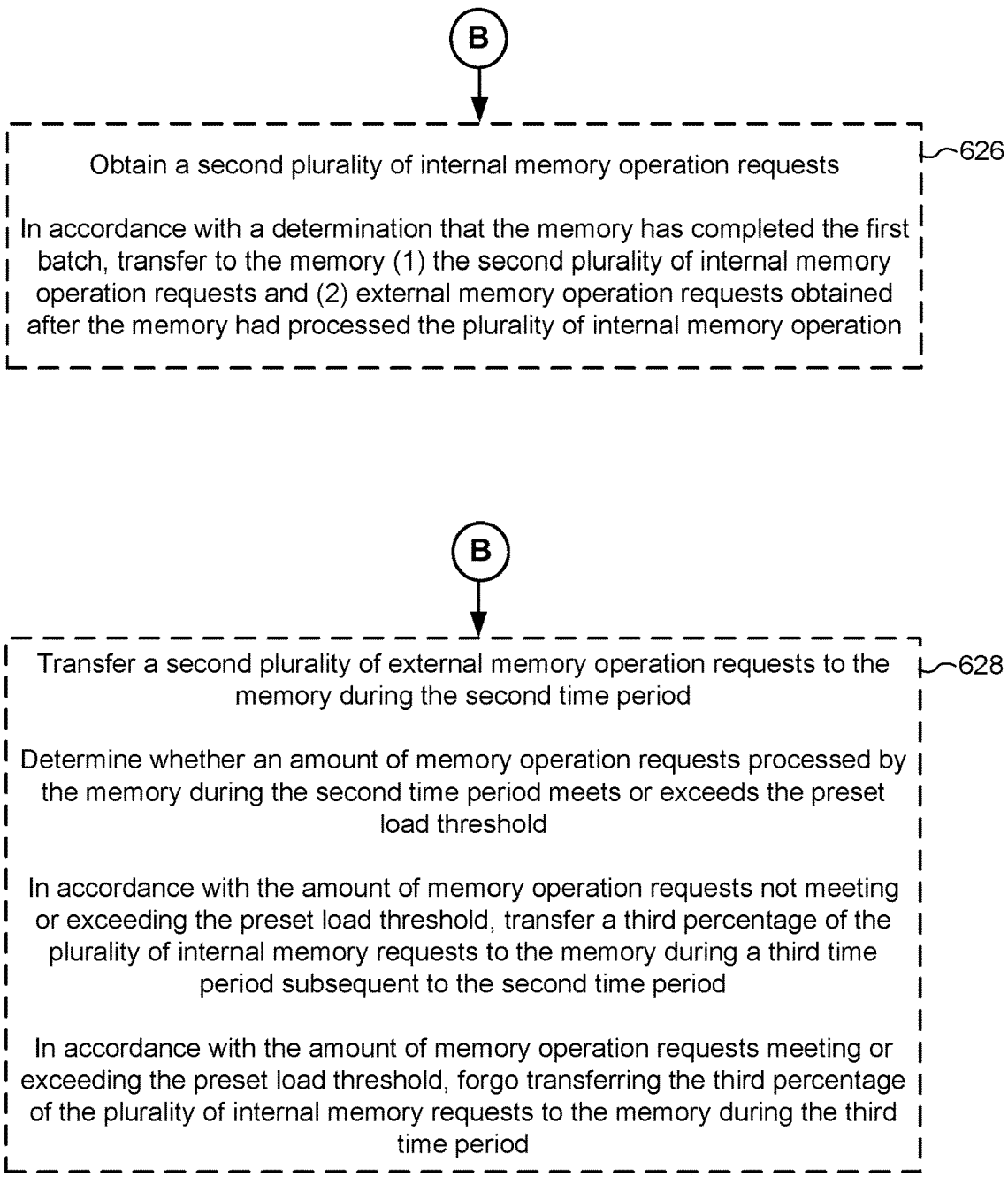

Attention is now directed to the flowchart representations of FIGS. 6A-6C. FIGS. 6A-6C illustrate a method 600 for processing memory operation requests, in accordance with some implementations. In some implementations, the method 600 is performed by: (1) one or more storage servers of a server system, such as the storage server(s) 106, FIG. 1; (2) one or more components of a storage server 106, such as the storage manager 216 of FIG. 2; or (3) a combination thereof. In some implementations, the operations of the method 600 described herein are entirely interchangeable, and the operations are performed by any of the aforementioned devices, systems, or combination of devices and/or systems. In some embodiments, the method 600 is governed by instructions that are stored in a non-transitory computer-readable storage medium and that are executed by one or more processors of a device/computing system, such as the one or more processing units 202 of a storage server 106. For clarity, the operations detailed below are described as being performed by a storage server (e.g., a storage server 106).

The storage server obtains (602) a plurality of internal memory operation requests for a non-volatile memory. In some implementations, the plurality of internal memory operation requests is generated by one or more storage services (e.g., storage service(s) 214 of FIG. 2). For example, FIG. 5A shows internal memory operation requests 504 sent from the storage service(s) 214 to the storage manager 216.

In some implementations, the internal memory operation requests include (604) memory operation requests corresponding to a garbage collection process, a caching process, a snapshotting process, and/or a mirroring process. In some implementations, the internal memory operation requests comprise memory operation requests generated at the server system 104.

In some implementations, the non-volatile memory includes (606) one or more HDDs and/or SSDs. In some implementations, the non-volatile memory includes flash memory and/or magnetic memory. In some implementations, the HDD(s) are configured (608) so as to minimize head movement. In some implementations, the HDDs include (610) a plurality of HDDs coupled in a redundant array of independent disks (RAID) configuration. In some implementations, the HDDs include a plurality of HDDs coupled in other configurations (e.g., as just a bunch of disks (JBoD) or a massive array of idle drives (MAID)).

The storage server obtains (612) a plurality of external memory operation requests for the non-volatile memory. For example, FIG. 5B shows external memory operation requests 508 sent from the client 102-1 to the server 106. In some implementations, the plurality of external memory operation requests originate from one or more devices remote (distinct) from the storage server (e.g., the clients 102).

The storage server regulates (614) a rate at which the plurality of internal memory operation requests is transferred to the non-volatile memory based on an amount of external memory operation requests in the plurality of external memory requests. In some implementations, regulating the rate at which the plurality of internal memory operation requests is transferred to the non-volatile memory is based on the type of non-volatile memory.

For example, a factor limiting performance of an HDD is disk head movements. In some instances, the plurality of internal memory operation requests (e.g., the internally-generated I/O) include cache flushes, cache loads and/or mirror resynchronization. In some instances and implementations, these internal memory operation requests require minimal disk head movements (e.g., reference data that is in proximity to one another). In some instances, a problem occurs because the HDD is configured to optimize the performance by re-ordering I/Os so as to minimize head movements. Thus, when there are internal memory operation requests referencing one region of the disk, external memory operation requests referencing other regions of the disk are delayed, because to service them would involve a larger head movement.

In some implementations, the storage server processes the internal memory operation requests in batches (e.g., in bursts). In some implementations, the internal memory operation requests are re-ordered (e.g., by the storage manager or the storage device) such that requests are processed in order of ascending disk block address, so as to minimize head movements. In some implementations, the internal memory operation requests are submitted in batches (e.g., with 32 or 64 requests in a batch). In some implementations, while the batch is in progress, one or more external memory operation requests are received by the storage server. In some implementations, these external memory operation requests are associated with the batch and forwarded to the storage device (e.g., an HDD). In some implementations, subsequent internal memory operation requests are batched in a second batch, and the second batch is not commenced (e.g., sent to the storage device) until all the requests in the first batch, both internally and externally generated, have completed. In some instances, the internal memory operation requests will complete before the external memory operation requests, because the internal requests require less disk head movement. Delaying the subsequent batch until all of requests in the first batch have completed will ensure that all of the external requests are completed. If additional internal requests are sent as soon as the first set are completed (e.g., without allowing the external requests to be completed), the storage device may process the additional internal requests before the external requests, because by doing so it may minimize head movements (e.g., at the expense of further delaying the external requests).

As another example, load balancing with an SSD does not involve minimizing head movements, but includes other challenges. An SSD can generally process a lot of requests very quickly (e.g., compared to an HDD). However, if a lot of internal requests are generated, this can result in a significant degradation of performance of external requests because the internal requests are consuming much of the SSD's I/O capabilities. Simple throttling of internal requests results in internal requests being slowed down unnecessarily when few external requests are received. For example, if the SSD is capable of processing 500 memory operations per second and the internal requests are restricted to 250 per second, then in instances where less than 250 external requests are present the internal requests are being unnecessarily restricted. It is preferable to restrict processing of internal requests (e.g., slow down the processing rate) when the level of externally generated requests is high, but remove or ease the restriction when the level of externally generated requests is low.

In some implementations, the storage server determines an expected performance of the SSD. For example, the storage server runs a performance test for a period of time using a 'typical' workload (e.g., an average workload based on a prior time period, such as a prior hour, day, or week). This enables the storage server to estimate a maximum IOPS performance of the SSD. In some implementations, I/O is then recorded over a particular interval (e.g., 1 second, 2 seconds, or 10 seconds). In some implementations, the particular interval is split into multiple sub intervals (e.g., ten 100-millisecond sub-intervals for a 1-second interval).

For example, in accordance with some implementations, if a maximum IOPS was estimated to be N, then in the first 100 millisecond sub-interval N/20 internally generated I/Os are allowed to be issued (e.g., sent to the SSD). In this example, at the end of the sub-interval, the total number of I/Os issued (internal and external) is checked. The maximum supported I/Os in that sub-interval, based on the performance test, would be N/10. In some implementations, when the total number of I/Os exceeds some threshold P of N/10 then the SSD is determined to be busy with externally generated I/Os. In some implementations, the threshold P is 70%, 80%, 95%, or the like. In some implementations, in accordance with the determination that the total number of I/Os exceeds the threshold P, no further internally generated I/Os are submitted until the current interval (e.g., a 1-second interval) completes. Conversely, in some implementations, when the total number of I/Os is less than the threshold P, then the SSD is determined not to be busy with externally generated I/Os. In some implementations, in accordance with the determination that the total number of I/Os is less than the threshold P, another burst of N/20 internally I/Os are allowed (e.g., sent to the SSD). In some implementations, at the end of the next 100-millisecond interval (200 ms into the first interval) the total number of I/Os is again determined and compared to the estimated maximum (e.g., 2N/10 or N/5). In some implementations, if the total number of I/Os is greater than P of N/5 no further internally generated I/Os are allowed during the first interval. In some implementations, if the total number of I/Os is less than P of N/5 another burst of N/20 is allowed. In some implementations, this process of determining the total number of I/Os and comparing to the threshold P continues for each of the ten 100-millisecond sub-intervals in the 1-second interval. Thus, a large amount of internally generated I/O are processed when external I/O loads are low and the less internally generated I/O are processed when external I/O loads are high (to reduce external latencies).

In some implementations, regulating the rate at which the plurality of internal memory operation requests is transferred to the non-volatile memory includes (616): (1) transferring a first batch of memory operation requests to the memory, including the internal memory operation requests (e.g., as shown in FIG. 4A); (2) assigning to the first batch external memory operation requests obtained while the memory processes the internal memory operation requests (e.g., as shown in FIG. 4C); and (3) assigning to a subsequent batch external memory operation requests obtained after the memory has processed the internal memory operation requests (e.g., as shown in FIG. 4E). In some implementations, each batch includes 32 to 64 internal memory operation requests.

In some implementations, the storage server (e.g., the storage manager 216) maintains a count of unprocessed operation requests in the first batch of operation requests. In some implementations, the storage server (e.g., the storage manager 216) determines that the operations for the first batch of operation requests have completed in accordance with the count of unprocessed operation requests reaching zero.

In some implementations, maintaining the count of unprocessed operation requests includes: (1) assigning the count a value equal to an initial number of operation requests in the first batch (e.g., the number of internal requests shown in FIG. 4A); (2) incrementing the count in response to an addition of an external memory operation request to the first batch; and (3) decrementing the count in response to notification from the one or more HDDs that an operation has completed.

In some implementations, regulating the rate at which the plurality of internal memory operation requests is transferred to the non-volatile memory includes (618): (1) transferring a percentage of the internal memory requests to the memory during a first time period based on an anticipated number of external requests (e.g., as shown in FIG. 5A); (2) transferring the external memory operation requests to the memory during the first time period (e.g., as shown in FIG. 5B); (3) determining whether an amount of memory operation requests processed by the memory during the first time period meets or exceeds a preset load threshold; (4) in accordance with the amount of memory operation requests not meeting or exceeding the preset load threshold, transfer a second percentage of the plurality of internal memory requests to the memory during a second time period; and (5) in accordance with the amount of memory operation requests meeting or exceeding the preset load threshold, forgo transferring the second percentage of the plurality of internal memory requests to the memory during the second time period.

In some implementations, the anticipated number of external requests is based on (620) a number of external memory operation requests obtained during a prior time period. For example, the number of requests 508 determined by the storage manager 216 in FIG. 5B. In some implementations, the time period is a day, an hour, a minute, or the like. In some implementations, the determination is based on a medium and/or mean number of external requests for the prior time period.

In some implementations, the storage server (e.g., the storage manager 216) determines a maximum rate of processing memory operations for the non-volatile memory (e.g., SSDs). In some implementations, transferring the percentage of the plurality of internal memory requests to the non-volatile memory during the first time period includes selecting an amount of internal memory operation requests to be processed during the first time period based on the anticipated number of external requests and the maximum rate. In some implementations, the number of internal memory operation requests is set to be a percentage of the total number of operation requests to be processed during a time period. In some implementations, if the anticipated number of external requests meets or exceeds a maximum threshold for the external requests, the internal requests are set to a minimum amount. For example, the anticipated number of external requests equals 90% or more of the maximum for the time period and the internal memory operation requests are set to be 10%. In some implementations, if the anticipated number of external requests is less than the maximum threshold the internal requests are set to a higher amount. For example, the anticipated number of external requests equals 50% or more of the maximum for the time period and the internal memory operation requests are set to be 50%.

In some implementations, determining whether an amount of memory operation requests processed by the non-volatile memory during the first time period meets or exceeds a preset load threshold includes determining a total number of requests transferred to the non-volatile memory during the first time period.

In some implementations, the storage server selects (622) an amount of internal memory operation requests to be processed during the first time period based on the anticipated number of external requests and the maximum rate of processing for the memory.

In some implementations, the storage server determines (624) a total number of requests transferred to the memory during the first time period.

In some implementations, the storage server (626): (1) obtains a second plurality of internal memory operation requests; and (2) in accordance with a determination that the memory has completed the first batch, transfers to the memory (a) the second plurality of internal memory operation requests and (b) external memory operation requests obtained after the memory had processed the plurality of internal memory operation.

In some implementations, the storage server (628): (1) transfers a second plurality of external memory operation requests to the memory during the second time period; (2) determines whether an amount of memory operation requests processed by the memory during the second time period meets or exceeds the preset load threshold; (3) in accordance with the amount of memory operation requests not meeting or exceeding the preset load threshold, transfers a third percentage of the plurality of internal memory requests to the memory during a third time period subsequent to the second time period; and (4) in accordance with the amount of memory operation requests meeting or exceeding the preset load threshold, forgoes transferring the third percentage of the plurality of internal memory requests to the memory during the third time period.

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein are also applicable in an analogous manner to the method 600 described above with respect to FIGS. 6A-6C.

It will also be understood that, although the terms first, second, etc. are, in some instances, used herein to describe various elements, these elements should not be limited by these terms. These terms are only used to distinguish one element from another. For example, a first extent could be termed a second extent, and, similarly, a second extent could be termed a first extent, without departing from the scope of the various described implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for reducing latency of external memory requests to non-volatile memory, comprising:
    at a server system having one or more server processors, a storage manager and non-volatile memory, wherein the server system is communicatively coupled to a plurality of client devices that has client processors and is remote from the server system:
        obtaining a plurality of internal memory operation requests for the non-volatile memory, the plurality of internal memory operation requests originating from within the server system;
        receiving, from the plurality of client devices, a plurality of external memory operation requests for the non-volatile memory, the plurality of external memory operation requests originating from the plurality of client devices; and
        dynamically regulating, by the storage manager of the server system, a rate at which the plurality of internal memory operation requests is transferred to the non-volatile memory, including:
            prior to obtaining the plurality of external memory operation requests, determining an anticipated number of external memory operation requests corresponding to a first time period;
            in accordance with a determination that the anticipated number of external memory operation requests meets or exceeds a first threshold for external requests, setting a minimum predetermined amount of internal memory operation requests to be transferred to the non-volatile memory during the first time period; and
            in accordance with the minimum predetermined amount of internal memory operation requests, sequentially:
                transferring a first portion of the plurality of internal memory operation requests to the non-volatile memory during the first time period;
                transferring the plurality of external memory operation requests to the non-volatile memory during the first time period; and
                in accordance with a determination that the external memory operation requests and the first portion of the internal memory operation requests do not meet or exceed a preset load threshold of the non-volatile memory, continuing to transfer a second portion of the plurality of internal memory operation requests to the non-volatile memory.

2. The method of claim 1, wherein the plurality of internal memory operation requests include memory operation requests corresponding to one or more of:
    a garbage collection process;
    a caching process;
    a snapshotting process; and
    a mirroring process.

3. The method of claim 1, wherein the non-volatile memory comprises one or more hard disk drives (HDDs); and
    wherein regulating the rate at which the plurality of internal memory operation requests is transferred to the non-volatile memory comprises:
        transferring a first batch of memory operation requests to the one or more HDDs, the first batch of memory operation requests including the plurality of internal memory operation requests;
        assigning to the first batch of memory operation requests external memory operation requests obtained while the one or more HDDs process the plurality of internal memory operation requests; and
        assigning to a subsequent batch external memory operation requests obtained after the one or more HDDs have processed the plurality of internal memory operations.

4. The method of claim 3, wherein the one or more HDDs are configured to minimize head movement.

5. The method of claim 3, wherein the one or more HDDs comprise a plurality of HDDs coupled in a redundant array of independent disks (RAID) configuration.

6. The method of claim 3, further comprising
    obtaining a second plurality of internal memory operation requests; and
    in accordance with a determination that the one or more HDDs have completed the first batch, transferring to the one or more HDDs (1) the second plurality of internal memory operation requests and (2) the external memory operation requests obtained after the one or more HDDs have processed the plurality of internal memory operations.

7. The method of claim 6, further comprising:
maintaining a count of unprocessed operation requests in the first batch of memory operation requests; and
determining that operations for the first batch of operation requests have completed in accordance with the count of unprocessed operation requests reaching zero.

8. The method of claim 7, wherein maintaining the count of unprocessed operation requests comprises:
assigning the count a value equal to an initial number of operation requests in the first batch;
incrementing the count in response to an addition of an external memory operation request to the first batch; and
decrementing the count in response to notification from the one or more HDDs that an operation has completed.

9. The method of claim 1, wherein the non-volatile memory comprises one or more solid state drives (SSDs); and
wherein regulating the rate at which the plurality of internal memory operation requests is transferred to the non-volatile memory comprises:
determining whether an amount of memory operation requests processed by the one or more SSDs during the first time period meets or exceeds the preset load threshold; and
in accordance with the amount of memory operation requests meeting or exceeding the preset load threshold, forgoing transferring the second portion of the plurality of internal memory operation requests to the one or more SSDs.

10. The method of claim 9, further comprising determining a maximum rate of processing memory operations for the one or more SSDs; and
wherein transferring the first portion of the plurality of internal memory operation requests to the one or more SSDs during the first time period comprises selecting an amount of internal memory operation requests to be processed during the first time period based on the anticipated number of external requests and the maximum rate.

11. The method of claim 9, wherein determining whether an amount of memory operation requests processed by the one or more SSDs during the first time period meets or exceeds the preset load threshold comprises determining a total number of requests transferred to the one or more SSDs during the first time period.

12. The method of claim 9, further comprising:
transferring a second plurality of external memory operation requests to the one or more SSDs during a second time period subsequent to the first time period;
determining whether an amount of memory operation requests processed by the one or more SSDs during the second time period meets or exceeds the preset load threshold;
in accordance with the amount of memory operation requests not meeting or exceeding the preset load threshold, transferring a third portion of the plurality of internal memory operation requests to the one or more SSDs during a third time period subsequent to the second time period; and
in accordance with the amount of memory operation requests meeting or exceeding the preset load threshold, forgoing transferring the third portion of the plurality of internal memory operation requests to the one or more SSDs during the third time period.

13. The method of claim 1, wherein determining the anticipated number of external requests is based on a number of external memory operation requests obtained during a prior time period.

14. The method of claim 1, further comprising:
reordering the plurality of internal memory operation requests according to a respective disc block address of each of the plurality of internal memory operation requests.

15. The method of claim 1, wherein:
the non-volatile memory of the server system includes a plurality of types of memory, and
dynamically regulating the rate at which the plurality of internal memory operation requests is transferred to the non-volatile memory is based on each type of memory in the non-volatile memory, and further comprises:
determining a first memory type of at least a subset of the plurality of internal memory operation requests; and
in accordance with a determination of the first memory type, reordering the subset of the plurality of internal memory operation requests in an order of ascending disk block address to minimize head movements.

16. The method of claim 1, wherein dynamically regulating the rate at which the plurality of internal memory operation requests is transferred to the non-volatile memory further comprises:
in accordance with a determination that the anticipated number does not meet or exceed a second threshold for external requests, identifying a maximum predetermined amount of internal memory operation requests to be transferred to the non-volatile memory during the first time period, the maximum predetermined amount being greater than the minimum predetermined amount.

17. A server system comprising:
one or more server processors;
a storage manager;
non-volatile memory; and
first memory coupled to the one or more server processors, the first memory storing one or more programs configured to be executed by the one or more server processors, the one or more programs including instructions for:
obtaining a plurality of internal memory operation requests for the non-volatile memory, the plurality of internal memory operation requests originating from within the server system;
receiving, from the plurality of client devices, a plurality of external memory operation requests for the non-volatile memory, the plurality of external memory operation requests originating from the plurality of client devices; and
dynamically regulating, by the storage manager of the server system, a rate at which the plurality of internal memory operation requests is transferred to the non-volatile memory, including:
prior to obtaining the plurality of external memory operation requests, determining an anticipated number of external memory operation requests corresponding to a first time period;
in accordance with a determination that the anticipated number of external memory operation requests meets or exceeds a first threshold for external requests, setting a minimum predetermined amount of internal memory operation requests to be transferred to the non-volatile memory during the first time period; and in accordance with the minimum predetermined amount of internal memory operation requests, sequentially:

transferring a first portion of the plurality of internal memory operation requests to the non-volatile memory during the first time period;

transferring the plurality of external memory operation requests to the non-volatile memory during the first time period; and in accordance with a determination that the external memory operation requests and the first portion of the internal memory operation requests do not meet or exceed a preset load threshold of the non-volatile memory, continuing to transfer a second portion of the plurality of internal memory operation requests to the non-volatile memory.

18. The server system of claim 17, wherein the non-volatile memory comprises one or more hard disk drives (HDDs); and wherein regulating the rate at which the plurality of internal memory operation requests is transferred to the non-volatile memory comprises:

transferring a first batch of memory operation requests to the one or more HDDs, the first batch including the plurality of internal memory operation requests;

assigning to the first batch external memory operation requests obtained while the one or more HDDs process the plurality of internal memory operation requests; and assigning to a subsequent batch external memory operation requests obtained after the one or more HDDs have processed the plurality of internal memory operations.

19. A non-transitory computer-readable storage medium storing one or more programs, the one or more programs comprising instructions, which when executed by a server system having a non-volatile memory and one or more server processors, cause the server system to:

obtaining a plurality of internal memory operation requests for the non-volatile memory, the plurality of internal memory operation requests originating from within the server system;

receiving, from the plurality of client devices, a plurality of external memory operation requests for the non-volatile memory, the plurality of external memory operation requests originating from the plurality of client devices; and dynamically regulating, by the storage manager of the server system, a rate at which the plurality of internal memory operation requests is transferred to the non-volatile memory, including:

prior to obtaining the plurality of external memory operation requests, determining an anticipated number of external memory operation requests corresponding to a first time period;

in accordance with a determination that the anticipated number of external memory operation requests meets or exceeds a first threshold for external requests, setting a minimum predetermined amount of internal memory operation requests to be transferred to the non-volatile memory during the first time period; and in accordance with the minimum predetermined amount of internal memory operation requests, sequentially:

transferring a first portion of the plurality of internal memory operation requests to the non-volatile memory during the first time period;

transferring the plurality of external memory operation requests to the non-volatile memory during the first time period; and in accordance with a determination that the external memory operation requests and the first portion of the internal memory operation requests do not meet or exceed a preset load threshold of the non-volatile memory, continuing to transfer a second portion of the plurality of internal memory operation requests to the non-volatile memory.

20. The non-transitory computer-readable storage medium of claim 19, wherein the non-volatile memory comprises one or more hard disk drives (HDDs); and wherein regulating the rate at which the plurality of internal memory operation requests is transferred to the non-volatile memory comprises:

transferring a first batch of memory operation requests to the one or more HDDs, the first batch including the plurality of internal memory operation requests;

assigning to the first batch external memory operation requests obtained while the one or more HDDs process the plurality of internal memory operation requests; and assigning to a subsequent batch external memory operation requests obtained after the one or more HDDs have processed the plurality of internal memory operations.

* * * * *